(12) United States Patent
Sugita et al.

(10) Patent No.: US 9,310,911 B2
(45) Date of Patent: Apr. 12, 2016

(54) DISPLAY DEVICE

(75) Inventors: Yasuhiro Sugita, Osaka (JP); Kazutoshi Kida, Osaka (JP); Shinji Yamagishi, Osaka (JP); Yuhji Yashiro, Osaka (JP); Hiroyuki Ogawa, Osaka (JP); Shigeyasu Mori, Osaka (JP); Seiji Kaneko, Osaka (JP); Yasuyuki Ogawa, Osaka (JP); Kaoru Yamamoto, Osaka (JP); Kohhei Tanaka, Osaka (JP); Seiichi Uchida, Osaka (JP); Yutaka Takamaru, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 122 days.

(21) Appl. No.: 14/234,950

(22) PCT Filed: Jul. 27, 2012

(86) PCT No.: PCT/JP2012/069252
§ 371 (c)(1),
(2), (4) Date: Jan. 24, 2014

(87) PCT Pub. No.: WO2013/018736
PCT Pub. Date: Feb. 7, 2013

(65) Prior Publication Data
US 2014/0145996 A1    May 29, 2014

(30) Foreign Application Priority Data
Jul. 29, 2011 (JP) .................................. 2011-167736

(51) Int. Cl.
*G06F 3/041* (2006.01)
*G09G 5/00* (2006.01)
(Continued)

(52) U.S. Cl.
CPC ................ *G06F 3/041* (2013.01); *G06F 3/044* (2013.01); *G06F 3/0412* (2013.01); *G09G 3/3648* (2013.01); *G09G 2356/00* (2013.01)

(58) Field of Classification Search
CPC ......... G06F 3/041; G06F 3/042; G06F 3/044; G06F 3/045; G09G 5/00; G09G 3/36
See application file for complete search history.

(56) References Cited

U.S. PATENT DOCUMENTS

2006/0158202 A1* 7/2006 Umeda et al. ................. 324/686
2009/0179868 A1   7/2009 Ayres et al.
(Continued)

FOREIGN PATENT DOCUMENTS

CN        101470290 A     7/2009
JP        2010-061647 A   3/2010
(Continued)

OTHER PUBLICATIONS

Official Communication issued in International Patent Application No. PCT/JP2012/069252, mailed on Oct. 30, 2012.
(Continued)

*Primary Examiner* — Nguyen H Truong
(74) *Attorney, Agent, or Firm* — Keating & Bennett, LLP

(57) ABSTRACT

A semiconductor layer for an active element included in each of a plurality of pixels in a display section is constituted by an oxide layer containing at least one element selected from the group consisting of In, Ga, and Zn. There is provided, for the display section, a liquid crystal panel's timing controller (13) configured to carry out control so that (i) a length of a first period during which image data is written is not more than twice that of the second period and/or (ii) one (1) frame period is longer than 16.7 msec.

11 Claims, 25 Drawing Sheets

(51) Int. Cl.
    *G06F 3/042*     (2006.01)
    *G06F 3/044*     (2006.01)
    *G09G 3/36*     (2006.01)

(56) References Cited

U.S. PATENT DOCUMENTS

| | | | |
|---|---|---|---|
| 2010/0033450 A1* | 2/2010 | Koyama et al. | 345/175 |
| 2010/0060591 A1 | 3/2010 | Yousefpor et al. | |
| 2010/0066724 A1* | 3/2010 | Huh et al. | 345/213 |
| 2011/0042152 A1* | 2/2011 | Wu | 178/18.03 |
| 2011/0148785 A1 | 6/2011 | Oda et al. | |
| 2011/0148806 A1 | 6/2011 | Oda et al. | |
| 2011/0153263 A1 | 6/2011 | Oda et al. | |
| 2011/0304564 A1* | 12/2011 | Kim et al. | 345/173 |
| 2012/0050217 A1* | 3/2012 | Noguchi et al. | 345/174 |
| 2012/0188196 A1* | 7/2012 | Liu et al. | 345/174 |

FOREIGN PATENT DOCUMENTS

| | | |
|---|---|---|
| JP | 2011-128982 A | 6/2011 |
| WO | 2013/018625 A1 | 2/2013 |

OTHER PUBLICATIONS

Naga et al., "45.1: Touch Panel Embedded IPS-LCD with Parasitic Current Reduction Technique" SID 2010 Digest, 2010, pp. 669-672.

* cited by examiner

F I G. 1
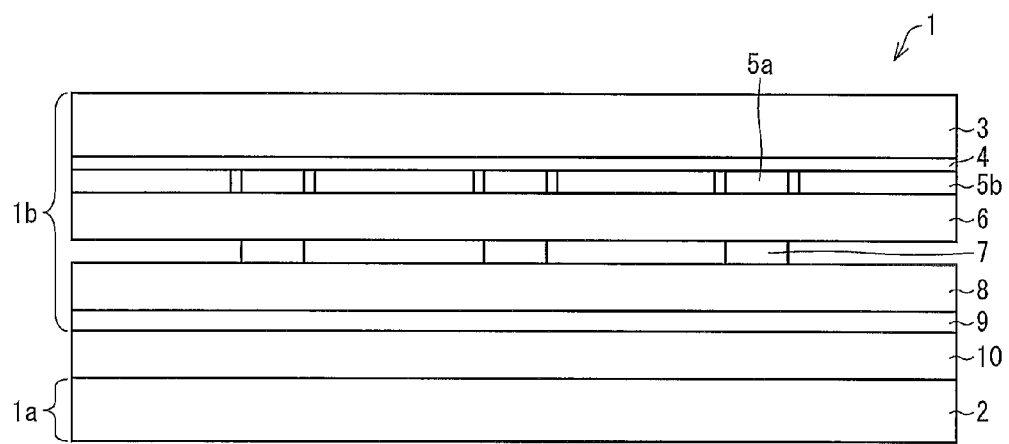

FIG. 3

| | α-Si | IGZO | POLY Si (POLYCRYSTALLINE SILICON) | CGS (CONTINUOUS-GRAIN SILICON) |
|---|---|---|---|---|
| MOBILITY | POOR | AVERAGE | GOOD | GOOD |
| HIGH SPEED WRITING (NUMBER OF TIMES INTEGRAL IS CALCULATED) | POOR | AVERAGE | GOOD | GOOD |
| LEAKAGE CHARACTERISTICS DURING OFF STATE | POOR | GOOD | POOR | POOR |
| DRIVING WITH IDLE PERIODS (LOW-FREQUENCY DRIVING) | POOR | GOOD | POOR | POOR |
| PROCESSING COST | GOOD | GOOD | POOR | POOR |
| PREFERABLE TFT STRUCTURE | Single TFT Single S/D | | Dual TFT LDD | |

F I G. 4
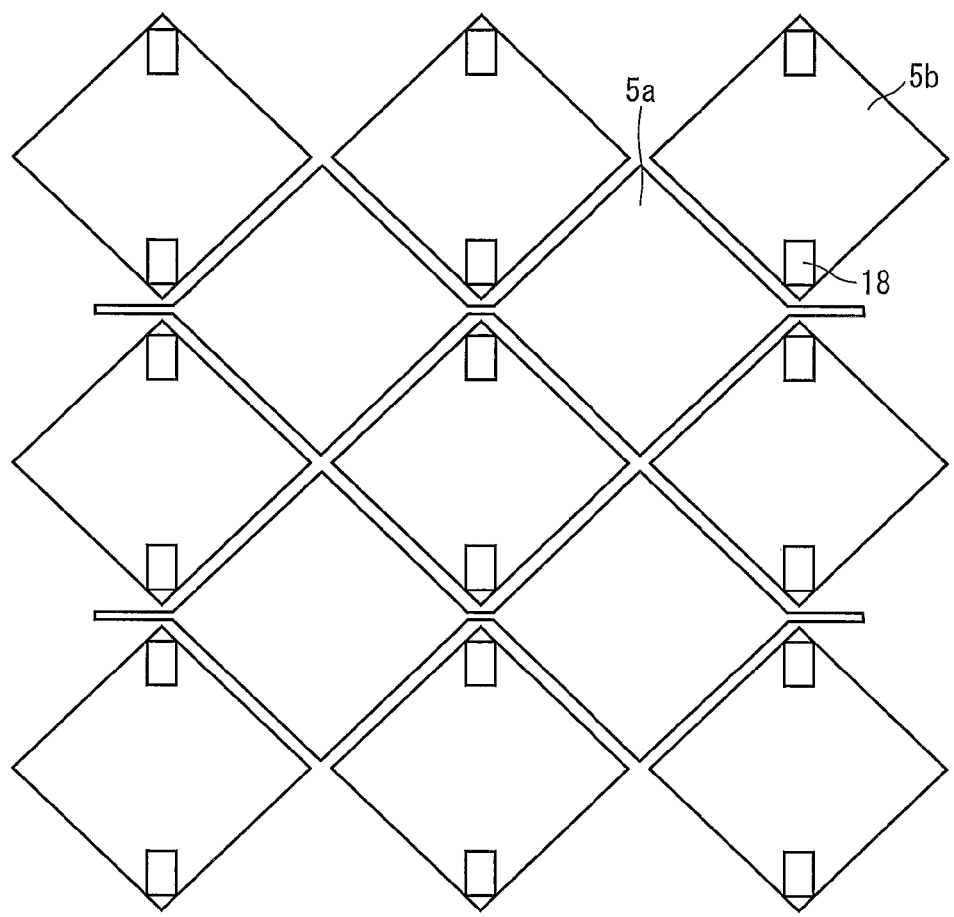

F I G. 8

| STEP | SAMPLING CIRCUIT | | RESET | FUNCTION |
|---|---|---|---|---|
| | 0 | 1 | | |
| A | X | — | X | ALL-RESET |
| B | — | — | — | DEADTIME |
| C | — | X | — | CHARGE TRANSFER |
| D | — | — | — | DEADTIME |
| E | X | — | — | KEEP |
| F | X | — | — | MEASURE |

X : SWITCH IS ON
— : SWITCH IS OFF

FIG. 9
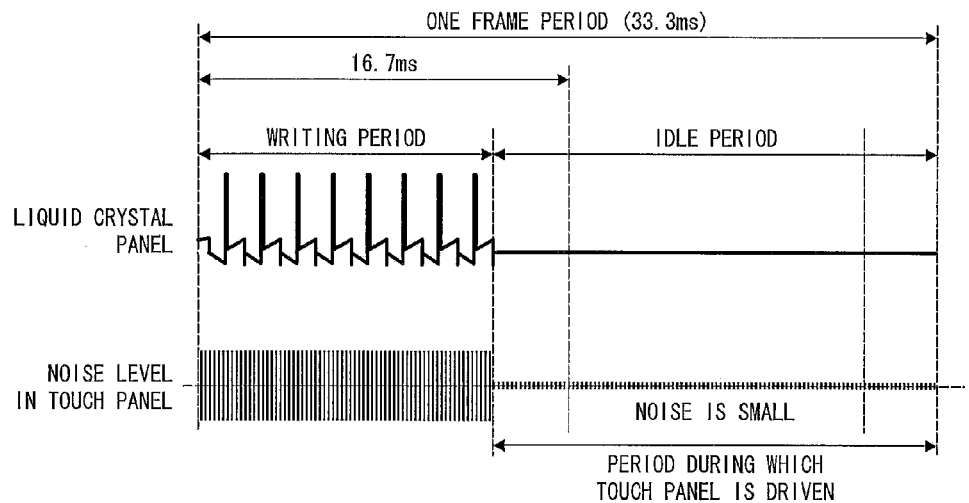
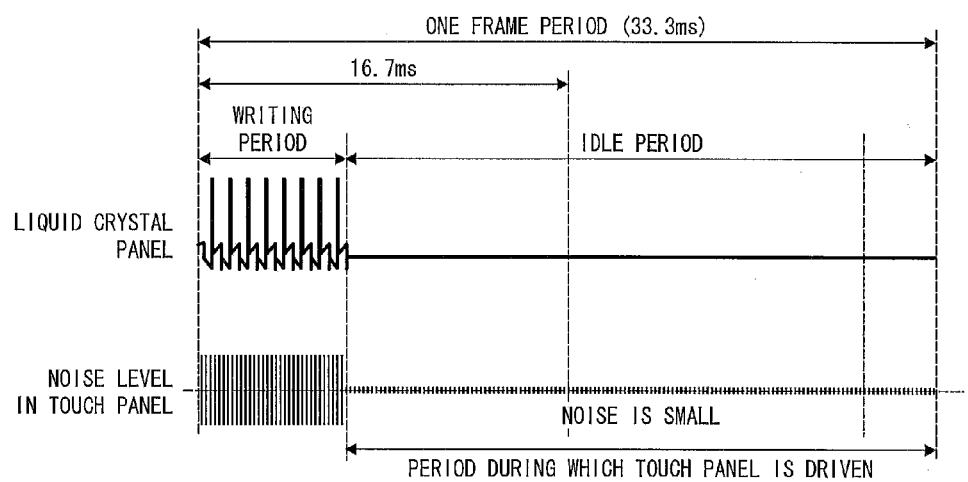

FIG. 10
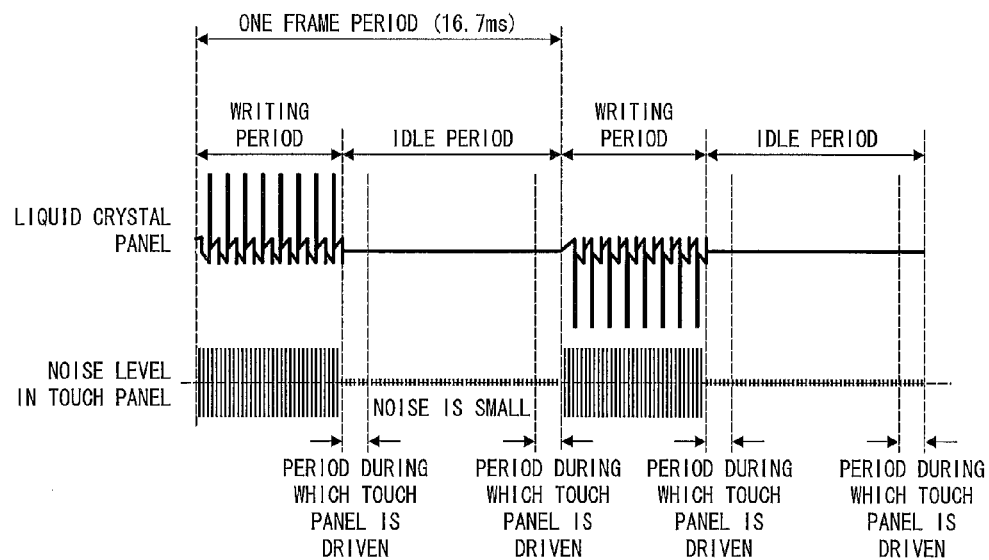
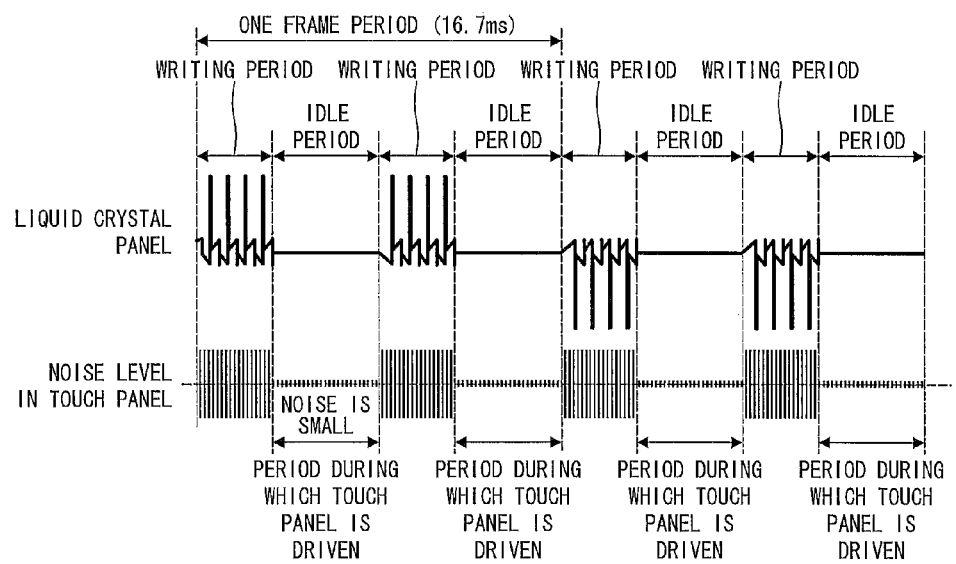

F I G. 1 4
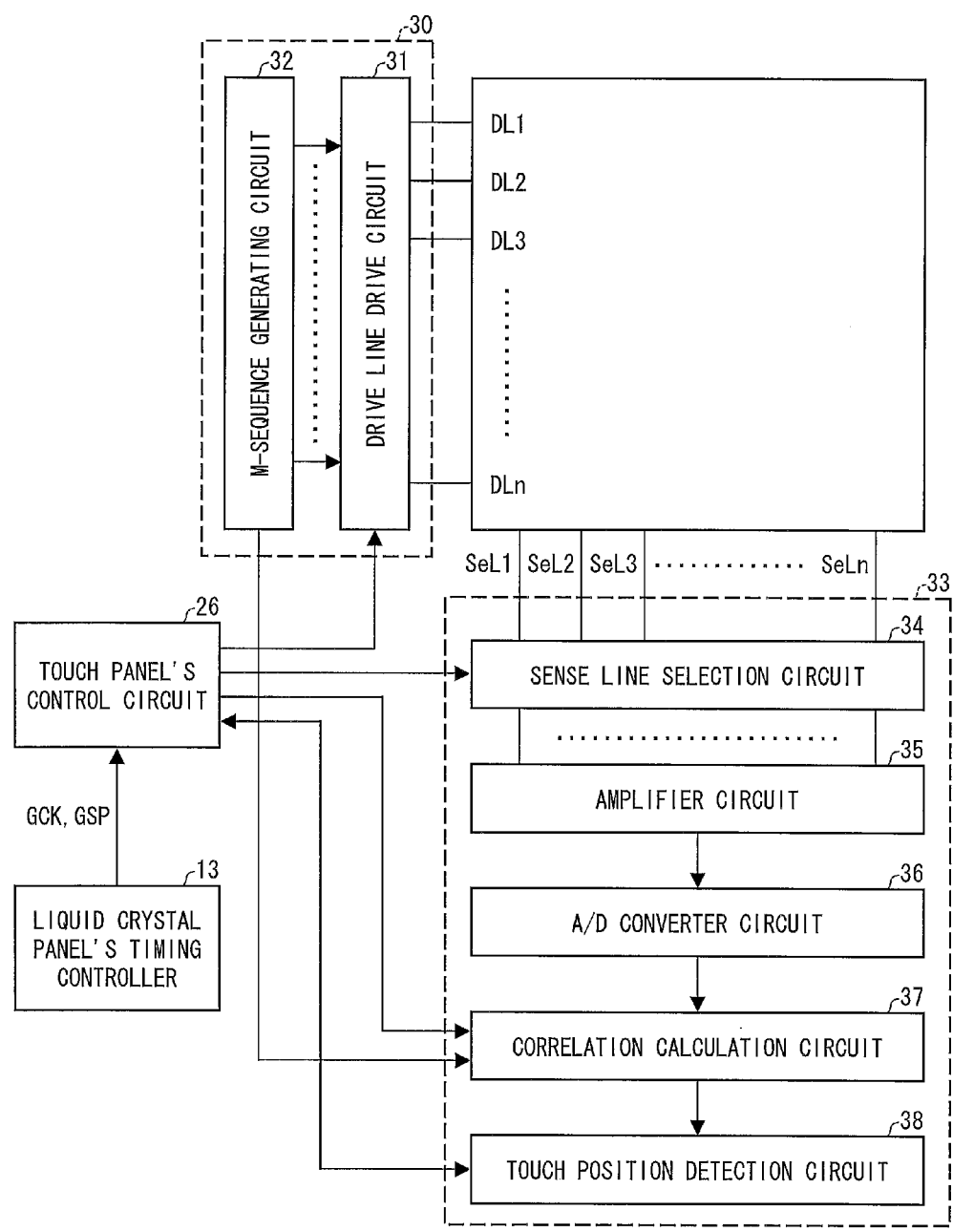

F I G. 16
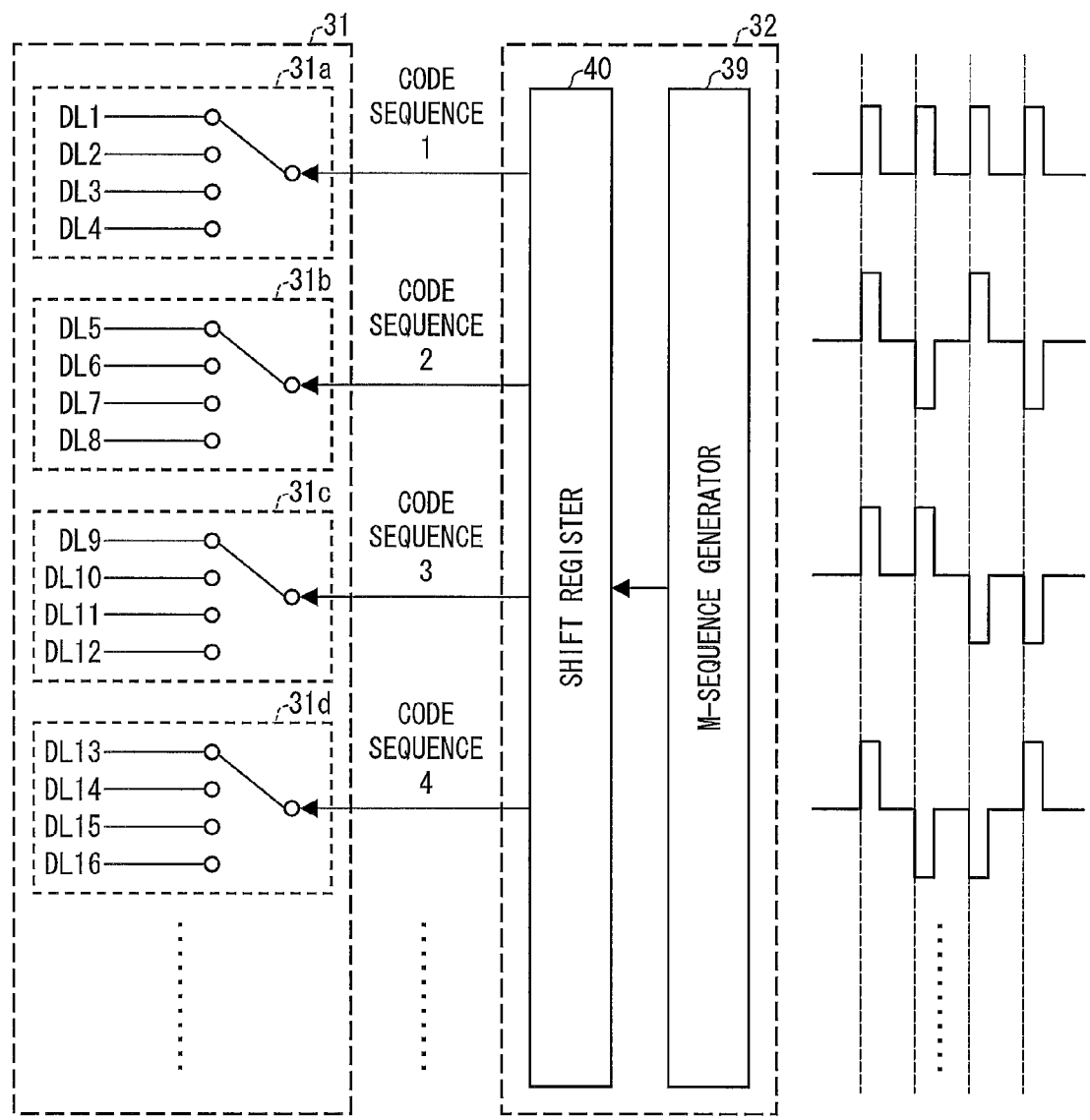

F I G. 1 7
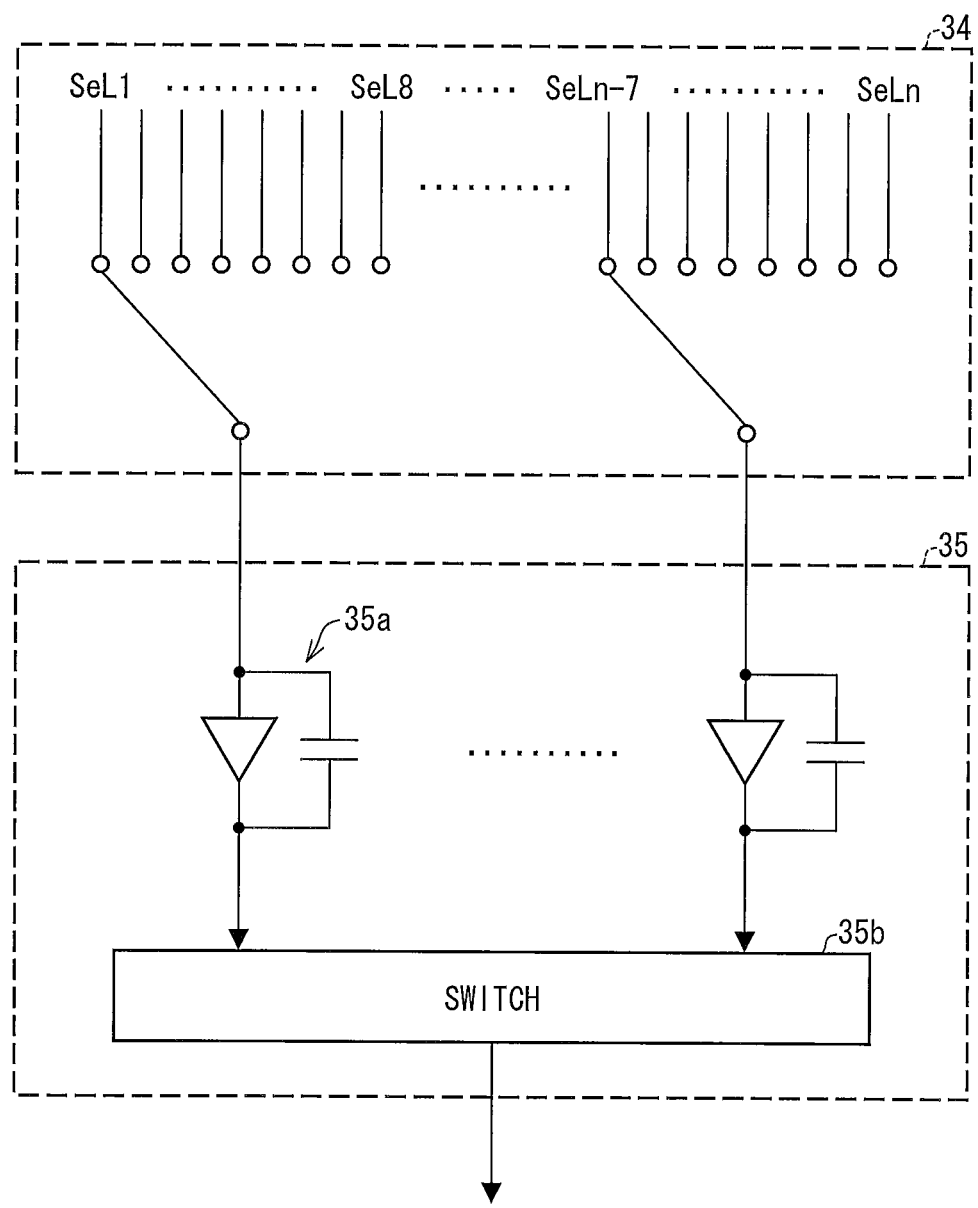

F I G. 1 8
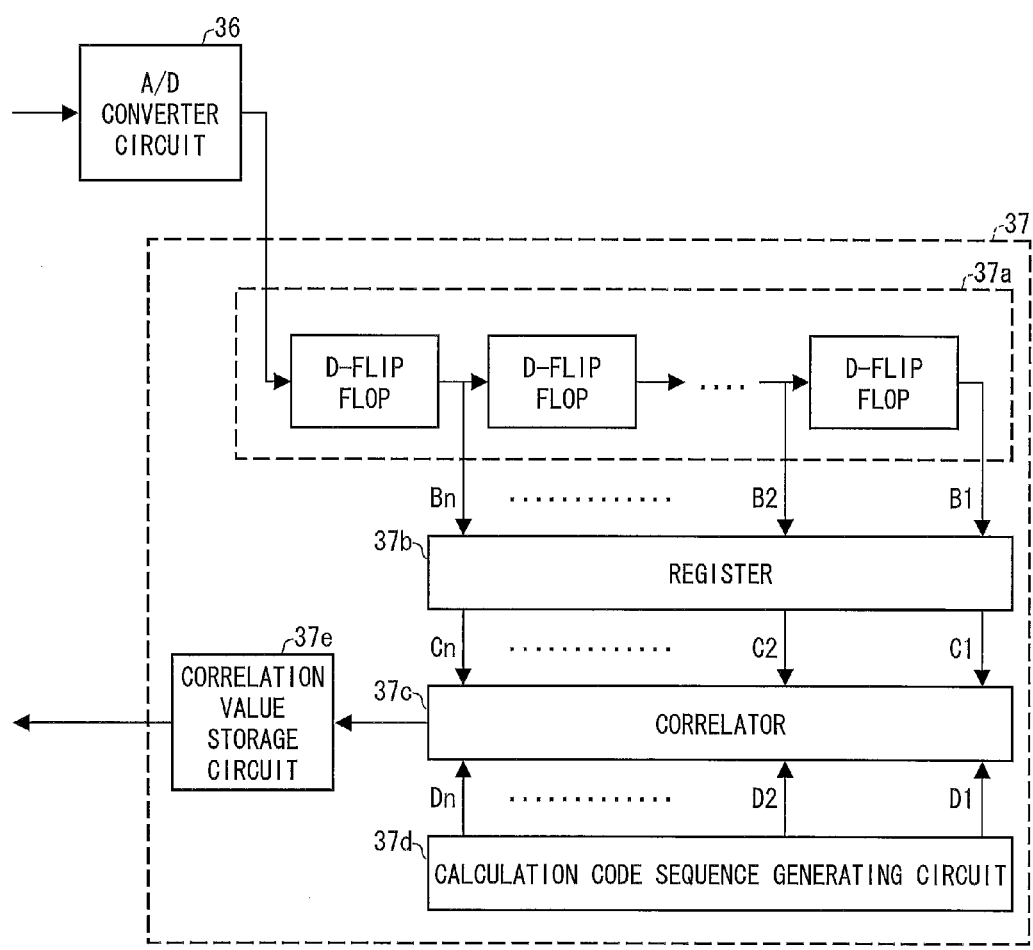

F I G. 2 0
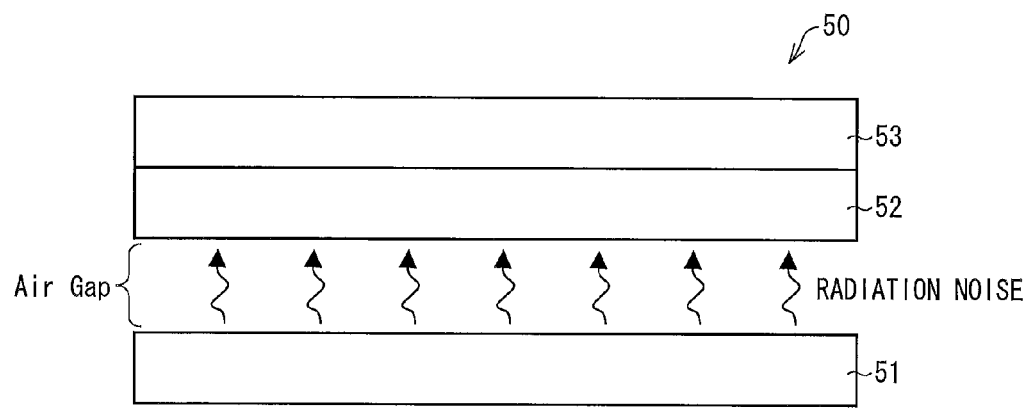

F I G. 2 1
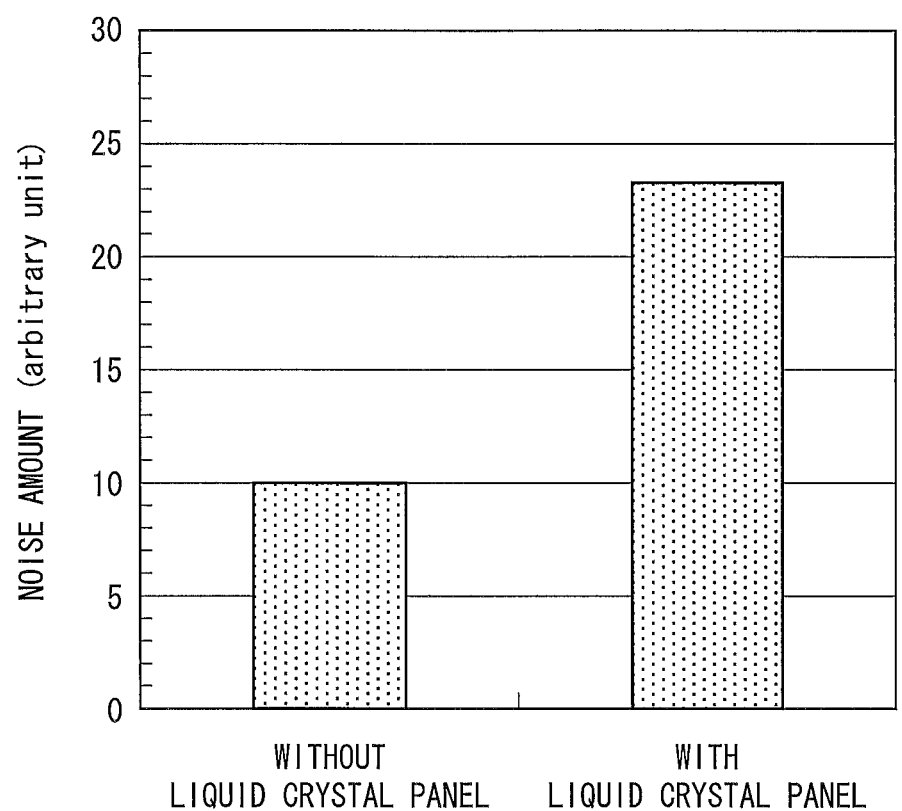

DISPLAY DEVICE

TECHNICAL FIELD

The present invention relates to a display device including a position detecting section and a display section.

BACKGROUND ART

In recent years, a display device including a touch panel, which has a screen designed to be touched by a detection target such as a finger or a stylus and to detect the contact position, has been generally used particularly in the field of mobile devices such as smartphones and mobile phones.

Conventionally, as the touch panel to be included in such a display device, there have been mainly the following touch panels used: a resistive film touch panel (when the touch panel is pressed, an upper conductive board and a lower conductive board are brought into contact with each other, whereby the contact position is detected); or a capacitive touch panel (a change in capacitance at a touched position is detected, whereby the contact position is detected).

Of these, the capacitive touch panel has been mainly used recently, because it (i) is capable of detecting the contact position by simple operations and (ii) does not have to have two conductive films having an air gap between them like the resistive film touch panel and therefore the reflection of external light does not occur at a boundary between the air gap and the conductive film.

However, the capacitive touch panel has the following problem. That is, the capacitive touch panel is configured to detect the contact position of a detection target such as a finger by sensing a change in capacitance. If the touch panel receives radiation noise from outside, the noise eventually causes a change in capacitance. As a result, it becomes not possible to accurately detect the contact position.

FIG. 20 schematically illustrates a configuration of a display device including a general touch panel.

A display device 50 includes a liquid crystal panel 51, a touch panel 52 and a cover glass 53. The liquid crystal panel 51 and the touch panel 52 have an air gap between them. It should be noted that, in recent years, an air gap-free structure has also been increasingly used.

However, when the liquid crystal panel 51 is in operation, radiation noise occurs which adversely affects the operation of the touch panel 52 (see FIG. 20).

FIG. 21 illustrates how the amount of noise that the touch panel 52 receives changes depending on the presence of the liquid crystal panel 51.

As illustrated in FIG. 21, when there is the liquid crystal panel 51, the touch panel 52 receives much more noise as compared to when there is no liquid crystal panel 51. Therefore, the SN ratio (signal-to-noise ratio) decreases. This leads to a decrease in detection performance of the touch panel 52, and detection errors may occur more frequently.

Noise analysis was conducted on the liquid crystal panel 51. As a result, it was found that (i) the noise which is a cause of a decrease in detection performance of the touch panel 52 is radiation noise coming from the liquid crystal panel 51 and (ii) the radiation noise is being generated in the liquid crystal panel 51 while display data is being written, specifically, during a short period of time at the start of charging data lines.

In order to solve such a problem, Haga et al. have proposed the following method in Non-patent Literature 1 (SID 2010 DIGEST, pp. 669). In a display device including a surface-mount self-capacitance touch panel which is a kind of capacitive touch panel, the operations of the touch panel and a liquid crystal panel are synchronized with each other so that the touch panel is driven while no data is written to the liquid crystal panel. Contact positions are detected in this state.

FIG. 22 schematically illustrates a configuration of a display device 60 including the touch panel described in Non-patent Literature 1.

As illustrated in FIG. 22, the display device 60 includes a color filter substrate 61 and a TFT substrate 64. These substrates have a liquid crystal layer between them (not illustrated).

The color filter substrate 61 has, on its surface facing the TFT substrate 64, a color filter layer and an alignment film etc. (these are not illustrated) and has, on the opposite surface, a surface ITO layer 62 and a polarization film.

The surface ITO layer 62 has, at its four corners, four detection systems 63a, 63b, 63c and 63d which are constituted by voltage supply circuits $VS_1$ to $VS_4$ and current sensing circuits $I_1$ to $I_4$, respectively. The surface ITO layer 62 is configured to receive, at its four corners, voltages of the same level applied from the respective voltage supply circuits $VS_1$ to $VS_4$.

Under the circumstances, when a finger makes contact with the touch panel, a small amount of electric current passes through the finger via a capacitor $C_r$.

Depending on the position where the finger makes contact with the touch panel, different current values are sensed by the current sensing circuits $I_1$ to $I_4$ of the four detection systems 63a, 63b, 63c and 63d. On the basis of this, the contact position of the finger is detected.

Meanwhile, the TFT substrate 64 has, on its surface facing the color filter substrate 61, a plurality of pixel TFT elements 65, a gate driver (gate signal line drive circuit) 66, a data driver (data signal line drive circuit) 67, a common electrode Com and the like. The common electrode Com is electrically connected with a common electrode driver 68.

FIG. 23 illustrates timings of operation of the display device 60 shown in FIG. 22.

As illustrated in FIG. 23, the touch panel is configured such that it is driven to detect a touch during a V-blank period (during which the liquid crystal panel is not driven). During this period, both the output from the gate signal driving circuit and the output from the data signal line drive circuit are high impedance (Hi-Z).

That is, (i) the operation of the touch panel and the operation of the liquid crystal panel are synchronized with each other and (ii) the touch panel is driven and the contact position of a finger is detected during a period other than the "Addressable" period (see FIG. 23) during which data is being written to the liquid crystal panel.

As described above, by the driving method as described in Non-patent Literature 1, it is possible to prevent the effects of noise that occurs while data is being written to the liquid crystal panel.

FIG. 24 schematically illustrates a configuration of a mutual-capacitance touch panel which is a kind of capacitive touch panel and shows operating principle of the mutual-capacitance touch panel.

(a) of FIG. 24 illustrates one example of how electrodes in the mutual-capacitance touch panel are arranged.

As illustrated in (a) of FIG. 24, a plurality of drive electrodes 70 are electrically separated from each other, and are arranged parallel to each other so that their lengths are along the horizontal direction in (a) of FIG. 24. On the other hand, a plurality of sense electrodes 71 are electrically separated from each other, and are arranged parallel to each other so that their lengths are along the vertical direction in (a) of FIG. 24.

(b) of FIG. 24 shows cross sections each taken along line AB in (a) of FIG. 24. This shows how a capacitance $C_F$ between a drive electrode 70 and its neighbouring sense electrode 71 changes when a detection target such as a finger, which was not in contact with the touch panel, makes contact with the touch panel.

As illustrated in (b) of FIG. 24, the capacitance is larger when nothing is in touch with the touch panel than when something is in touch with the touch panel (i.e., $C_{F\_untouch} > C_{F\_touch}$). The touch position can be detected by utilizing this principle.

The mutual-capacitance touch panel is capable of, when a plurality of detection targets such as fingers make contact with the touch panel in different positions, detecting such a plurality of positions. That is, the mutual-capacitance touch panel has a so-called multi-touch detecting function.

Therefore, in such a mutual-capacitance touch panel, by employing the driving method disclosed in Non-Patent Literature 1, i.e., the driving method in which (i) the operations of the touch panel and a liquid crystal panel are synchronized with each other and (ii) the touch panel is driven and contact positions are detected while no data is written to the liquid crystal panel, it is possible to detect a plurality of touch positions (multiple touches) and prevent the effects of noise on the detection of the touch positions which noise occurs while data is being written to the liquid crystal panel.

CITATION LIST

Non-Patent Literature

Non-Patent Literature 1
SID 2010 DIGEST, pp. 669, Touch Panel Embedded IPS-LCD with Parasitic Current Reduction Technique Patent Literatures Patent Literature 1
Japanese Patent Application Publication, Tokukai, No. 2011-128982 A (Publication Date: Jun. 30, 2011)
Patent Literature 2
US Patent Application Publication No. US2010/0060591 A1 (Publication Date: Mar. 11, 2010)

SUMMARY OF INVENTION

Technical Problem

However, the driving method described in Non-patent Literature 1 has the following problem. That is, although the driving method makes it possible to prevent the effects of noise that occurs while data is being written to the liquid crystal panel, the method is basically designed such that part of one (1) frame is used to write data to the liquid crystal panel and the other part is used to drive the touch panel. Therefore, the length of time during which the touch panel can be driven is as short as 2 ms or less. Such a method does not make it possible to improve the SN ratio so as to accurately detect positions.

FIG. 25 shows a writing period and an idle period (1V blank) in one (1) frame period (16.7 ms) in a case where a liquid crystal panel is driven at 60 Hz.

As shown in FIG. 25, the touch panel receives large noise during the wiring period but small noise during the idle period (1V blank). In view of the level of noise that the touch panel receives, it is necessary that the touch panel be driven during the idle period (1V blank).

However, in recent years, there has been a strong demand for a display device with high image quality. Display devices such as a liquid crystal panel have been becoming more high-definition.

For this reason, the above method alone, i.e., the method in which (i) the operations of the touch panel and the liquid crystal panel are synchronized with each other and (ii) the touch panel is driven and contact positions are detected while no data is written to the liquid crystal panel, is not sufficient to secure a touch panel driving period that is long enough to increase the SN ratio and carry out accurate position detection.

It should be noted that the same problem arises also in the field of optical sensors operated in the same manner as the capacitive touch panel, each of which optical sensors includes a photodiode or a phototransistor that allows electric currents of different levels to pass therethrough depending on the amount of received light.

The present invention has been made in view of the above problems, and an object of the present invention is to provide a display device that includes (i) a position detecting section that has an improved SN ratio and is capable of carrying out position detection with high accuracy and (ii) a display section.

Solution to Problem

In order to attain the above object, a display device of the present invention is a display device, including: a position detecting section; and a display section including a plurality of pixels, each of the plurality of pixels including an active element including a semiconductor layer constituted by an oxide layer containing at least one element selected from the group consisting of In, Ga, and Zn, and the display section being configured to operate such that one frame period is constituted by (i) a first period during which image data is sequentially written to the plurality of pixels and (ii) a second period other than the first period, said display device further including: a timing control section for the display section, the timing control section being configured to carry out control so that (i) a length of the first period is not more than twice that of the second period and/or (ii) the one frame period is longer than 16.7 msec; and a control circuit for the position detecting section, the control circuit being configured to carry out sensing during the second period to thereby detect a position of a detection target.

According to the configuration, the semiconductor layer for the active element included in each of the plurality of pixels in the display section is constituted by an oxide layer containing at least one element selected from the group consisting of In, Ga, and Zn. The oxide layer is a semiconductor layer having a higher mobility than an amorphous silicon layer ($\alpha$-Si layer).

Therefore, it is possible to reduce the length of the first period, during which image data is sequentially written to the plurality of pixels included in the display section, to be not more than twice that of the second period, whereby it is possible to cause the length of the second period to be relatively long in the one frame period.

That is, by utilizing the second period whose length is relatively long, it is possible to increase the number of times sensing is carried out in the position detecting section. This makes it possible to realize a display device which includes (i) a position detecting section which has an improved SN ratio and is capable of carrying out position detection with high accuracy and (ii) a display section.

Meanwhile, since the semiconductor layer for the active element included in each of the pixels is constituted by an oxide layer containing at least one element selected from the group consisting of In, Ga, and Zn, the amount of current leakage while the active element is in OFF state is small. This makes it possible to reduce the frequency of the first period during which image data is sequentially written to the plurality of pixels included in the display section, and thus possible to cause the length of the one (1) frame period to be longer than 16.7 msec.

Since it is possible to increase the length of one (1) frame period, assuming that the length of the first period remains the same, it is possible to increase the length of the second period.

Therefore, by utilizing the second period whose length is long, it is possible to increase the number of times sensing is carried out in the position detecting section. This makes it possible to realize a display device which includes (i) a position detecting section which has an improved SN ratio and is capable of carrying out position detection with high accuracy and (ii) a display section.

Furthermore, since it is possible to increase the length of the second period, it is also possible to drive the position detecting section at a higher frequency than the display section. This makes it possible to realize a display device which includes (i) a position detecting section capable of carrying out position detection with higher accuracy and (ii) a display section.

Advantageous Effects of Invention

As has been described, a display device of the present invention includes: a position detecting section; and a display section including a plurality of pixels, each of the plurality of pixels including an active element including a semiconductor layer constituted by an oxide layer containing at least one element selected from the group consisting of In, Ga, and Zn, and the display section being configured to operate such that one frame period is constituted by (i) a first period during which image data is sequentially written to the plurality of pixels and (ii) a second period other than the first period, said display device further including: a timing control section for the display section, the timing control section being configured to carry out control so that (i) a length of the first period is not more than twice that of the second period and/or (ii) the one frame period is longer than 16.7 msec; and a control circuit for the position detecting section, the control circuit being configured to carry out sensing during the second period to thereby detect a position of a detection target.

Therefore, it is possible to realize a display device that includes (i) a position detecting section that has an improved SN ratio and is capable of carrying out position detection with high accuracy and (ii) a display section.

BRIEF DESCRIPTION OF DRAWINGS

FIG. 1 schematically illustrates a configuration of a liquid crystal display device of one embodiment of the present invention.

FIG. 3 is a table for explaining differences between (i) characteristics of an oxide semiconductor layer which can be used as a semiconductor layer for pixel TFT elements included in the liquid crystal display device of one embodiment of the present invention and (ii) characteristics of other semiconductor layers.

FIG. 4 illustrates the shapes of drive electrodes and sense electrodes in a touch panel included in the liquid crystal display device of one embodiment of the present invention.

FIG. 8 is a table for explaining the states of a sampling circuit and a reset switch in each step (STEP) in the timing chart for the touch panel shown in FIG. 7.

FIG. 9 shows (i) a writing period and (ii) an idle period during which the touch panel can be driven, which are in one (1) frame period, when the liquid crystal panel included in the liquid crystal display device of one embodiment of the present invention is driven at a low frequency of 30 Hz.

FIG. 10 shows a case where the liquid crystal panel and the touch panel included in the liquid crystal display device of one embodiment of the present invention are driven at 60 Hz and 120 Hz, respectively.

FIG. 14 schematically illustrates a configuration of a touch panel included in a liquid crystal display device of the third embodiment of the present invention.

FIG. 16 schematically illustrates a configuration of a drive line drive circuit included in the liquid crystal display device of the third embodiment of the present invention.

FIG. 17 schematically illustrates configurations of a sense line selection circuit and an amplifier circuit which are included in a sense line drive circuit of the liquid crystal display device of the third embodiment of the present invention.

FIG. 18 schematically illustrates a configuration of a correlation calculation circuit included in the sense line drive circuit of the liquid crystal display device of the third embodiment of the present invention.

FIG. 20 schematically illustrates a configuration of a display device including a conventionally-used touch panel.

FIG. 21 illustrates how the amount of noise that a touch panel receives changes depending on the presence of a liquid crystal panel.

DESCRIPTION OF EMBODIMENTS

Figure 2:
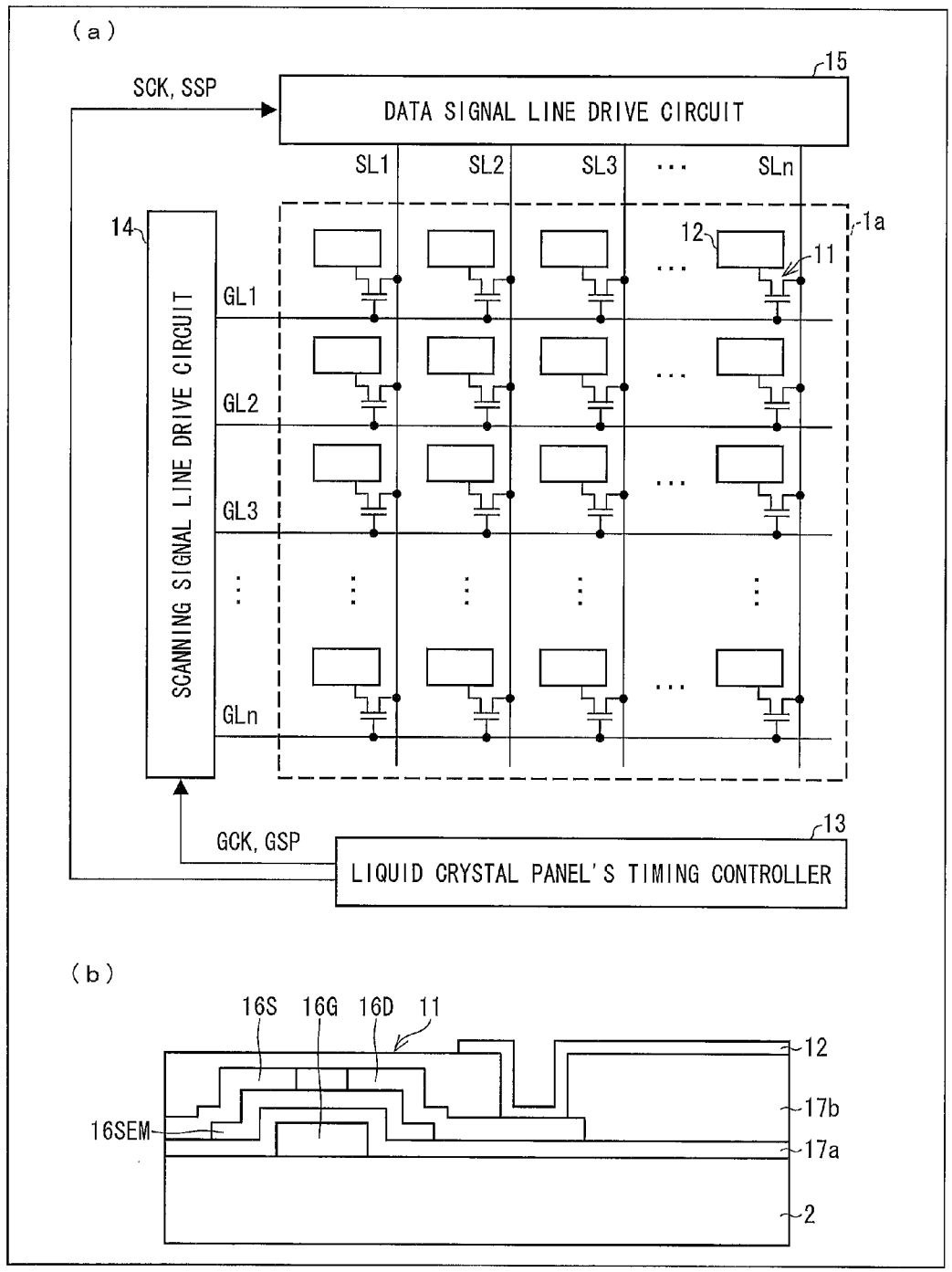
FIG. 2 schematically illustrates a configuration of a TFT substrate included in the liquid crystal display device of one embodiment of the present invention.

The following description will discuss, with reference to the drawings, embodiments of the present invention in detail. Note, however, that the sizes, materials, shapes and relative positions etc. of constituents described in the embodiments are examples, and the present invention should not be narrowly interpreted within the limits of such embodiments.

In the following embodiments, a display section included in a display device is discussed by taking a liquid crystal display panel as an example. However, it is needless to say that the display panel is not limited to a particular kind, provided that each pixel in the display section includes an active element. For example, the display section can be an organic EL display or the like.

Furthermore, in the following descriptions, a position detecting section included in the display device is discussed by taking a mutual-capacitance touch panel as an example, which is a kind of in-cell capacitive touch panel. Note, however, that the position detecting section is not limited to such. For example, various capacitive touch panels such as an out-cell touch panel or an on-cell touch panel can also be used. Alternatively, the position detecting section can be a photosensor operated in the same manner as the capacitive touch panel, which photosensor includes a photo diode or a phototransistor configured to allow electric currents of different levels to pass therethrough depending on the amount of received light.

Embodiment 1

The following description discusses Embodiment 1 of the present invention with reference to FIGS. 1 to 10.

FIG. 1 schematically illustrates a configuration of a liquid crystal display device 1 which includes an in-cell, mutual-capacitance touch panel.

As illustrated in FIG. 1, the liquid crystal display device 1 includes a TFT substrate 1a, a color filter substrate 1b, and a liquid crystal layer sandwiched between the TFT substrate 1a and the color filter substrate 1b.

The TFT substrate 1a is constituted by an insulating substrate 2 which has pixel TFT elements (not illustrated, described later in detail) on its surface facing the liquid crystal layer 10.

On the other hand, the color filter substrate 1b is constituted by an insulating substrate 3 which has, on its surface facing the liquid crystal layer 10, a black matrix/color filter layer 4, a layer of drive electrodes 5a and sense electrodes 5b, a first insulating layer 6, a layer of bridging electrodes 7, a second insulating layer 8, and a common electrode layer 9 stacked in this order.

In the present embodiment, the drive electrodes 5a and the sense electrodes 5b are on the same plane for a smaller thickness. Note, however, that this does not imply any limitation. The drive electrodes 5a and the sense electrodes 5b can be provided on two different layers.

FIG. 2 schematically illustrates a configuration of the TFT substrate 1a included in the liquid crystal display device 1.

As illustrated in (a) of FIG. 2, the TFT substrate 1a has a plurality of scanning signal lines GL1, GL2 . . . and GLn and a plurality of data signal lines SL1, SL2 . . . and SLn which are electrically separated from each other and intersect each other. In the vicinities of intersections of the scanning signal lines and the data signal lines, there are provided pixel TFT elements 11 electrically connected to their corresponding data signal lines, scanning signal lines and pixel electrodes 12.

Furthermore, a liquid crystal panel's timing controller 13, a scanning signal line drive circuit 14 and a data signal line drive circuit 15, which are for driving the TFT substrate 1a, are provided on or outside the TFT substrate 1a.

The scanning signal line drive circuit 14 supplies scanning signals to the scanning signal lines GL1, GL2 . . . and GLn, whereas the data signal line drive circuit 15 supplies data signals to the data signal lines SL1, SL2, . . . and SLn.

The liquid crystal panel's timing controller 13 is configured to (i) generate, in response to a clock signal and video sync signals (Hsync, Vsync) received from a system (not illustrated), a gate clock GCK and a gate start pulse GSP which are video sync signals serving as references for synchronized operations of the circuits, and supply the gate clock GCK and the gate start pulse GSP to the scanning signal line drive circuit 14 and (ii) generate a source clock SCK and a source start pulse SSP and supply the source clock SCK and the source start pulse SSP to the data signal line drive circuit 15. Furthermore, the liquid crystal panel's timing controller 13 is configured to generate, in response to the video sync signals (Hsync, Vsync), video data on the basis of video signals received from the system, and supplies the video data to the data signal line drive circuit 15.

(b) of FIG. 2 schematically illustrates a configuration of one of the pixel TFT elements 11 illustrated in (a) of FIG. 2.

As illustrated in (b) of FIG. 2, a pixel TFT element 11 is constituted by (i) a layer on which a gate electrode 16G and the scanning signal lines GL1, GL2 . . . and GLn are provided, (ii) a gate insulating layer 17a, (iii) a semiconductor layer 16SEM, (iv) a layer on which a source electrode 16S, a drain electrode 16D and the data signal lines SL1, SL2 . . . and SLn are provided, (v) an interlayer insulating layer 17b having a contact hole, and (vi) a pixel electrode 12 which is connected to the drain electrode 16D via the contact hole, which are stacked in this order on the insulating substrate 2.

In the present embodiment, the pixel TFT element 11 is configured like above for a higher aperture ratio. Note, however, that the configuration of the pixel TFT element that can be used here is not limited to such.

Note that, according to the present embodiment, an oxide layer containing at least one element selected from the group consisting of In, Ga, and Zn (such a layer is hereinafter referred to as an IGZO layer) is used as the semiconductor layer 16SEM of the pixel TFT element 11, because driving with idle periods (low-frequency driving) is available and processing cost can be reduced with the use of the IGZO layer.

FIG. 3 is a table for explaining differences between (i) characteristics of the IGZO layer which is used as the semiconductor layer 16SEM for the pixel TFT elements 11 and (ii) other semiconductor layers.

As illustrated in FIG. 3, in terms of mobility, these semiconductor layers are in the following relationship: α-Si layer<IGZO layer<poly Si layer=CGS layer. From a viewpoint of quick sequential writing of image data to pixels in the liquid crystal display device 1, the poly Si layer and the CGS layer are advantageous.

In a case where the writing can be completed in a short time, it is possible to reduce the length of a writing period that is part of one (1) frame period (this is described later in detail). Accordingly, it is possible to increase the length of an idle period during which the touch panel can be driven, and thus possible to increase the number of times an integral is calculated (the number of times sensing is carried out) in the touch panel. This makes it possible to realize a liquid crystal display device 1 including a touch panel which has an improved SN ratio and is capable of carrying out position detection with high accuracy.

On the other hand, in terms of leakage characteristics during OFF state, the IGZO layer allows the least leakage. In particular, since the IGZO layer is a wide band gap layer, the amount of current leakage due to light in the IGZO layer is much smaller than those in the α-Si layer, poly Si layer and CGS layer.

In a case where the amount of current leakage during OFF state is small, it is possible to employ a driving with idle periods (low-frequency driving). This makes it possible to reduce the frequency of writing and possible to increase the length of one (1) frame period.

Since it is possible to increase the length of one (1) frame period, assuming that the length of the writing period remains the same, it is possible to increase the length of the idle period during which the touch panel can be driven.

Accordingly, by utilizing the long idle period, it is possible to increase the number of times an integral is calculated (the number of times sensing is carried out) in the touch panel. This makes it possible to realize a liquid crystal display device 1 that has an improved SN ratio and is capable of carrying out position detection with high accuracy.

Furthermore, in terms of processing cost, the formations of the α-Si layer and the IGZO layer each require three to five masks but do not require laser annealing; whereas the formations of the poly Si layer and the CGS layer each require about 10 masks and also require laser annealing.

Therefore, the α-Si layer and the IGZO layer are advantageous in terms of processing cost.

In consideration of the above facts, the present embodiment uses the IGZO layer as the semiconductor layer 16SEM for the pixel TFT elements 11. This makes it possible to realize a high-performance liquid crystal display device 1 at low cost.

Lastly, a preferable structure of the pixel TFT element 11 is discussed below. The IGZO layer has a lower mobility than the poly Si layer and the CGS layer; however, the amount of current leakage due to light in the IGZO layer is small. Therefore, it is possible to use a single gate TFT (TFT constituted by one TFT element and one pair of source and drain electrodes) (see FIG. 3).

The single gate TFT achieves higher drive performance than a dual gate TFT (TFT constituted by two TFT elements and an LDD section), because its channel length is half the channel length of the dual gate TFT and it does not suffer resistance attributed to the LDD section.

On the other hand, the poly Si layer and the CGS layer have a higher mobility than the IGZO layer but the amount of current leakage due to light in them are large. By using the poly Si layer or the CGS layer in the dual gate TFT (TFT constituted by two TFT elements and an LDD section) (see FIG. 3), it is possible to reduce the amount of current leakage due to light.

That is, the pixel TFT elements 11 in the present embodiment, each of which is a single gate TFT including an IGZO layer, show driving performance as high as dual gate TFT elements including a poly Si layer or a CGS layer.

The pixel TFT elements 11, which are single gate TFT elements including an IGZO layer, are smaller in size than the dual gate TFT elements including a poly Si layer or a CGS layer. This makes it possible to realize a liquid crystal display device 1 with a high aperture ratio.

FIG. 4 illustrates the shapes of the drive electrodes 5a and the sense electrodes 5b in the touch panel included in the liquid crystal display device 1.

As illustrated in FIG. 4, each of the drive electrodes 5a is constituted by lozenge unit electrodes which are arranged close to each other along the horizontal direction in FIG. 4 and are electrically connected to each other. The drive electrodes 5a are arranged parallel to each other along the vertical direction in FIG. 4.

On the other hand, each of the sense electrodes 5b is constituted by lozenge unit electrodes which are arranged close to each other along the vertical direction in FIG. 4. The sense electrodes 5b are arranged parallel to each other along the horizontal direction in FIG. 4.

Adjacent ones of the unit electrodes of the sense electrodes 5b are electrically connected to each other by a bridging electrode (not illustrated) via contact holes 18 in a first insulating layer (not illustrated).

A part that connects between adjacent ones of the unit electrodes of the drive electrodes 5a overlaps a bridging electrode when viewed from above. However, since the bridging electrode is provided on the first insulation layer, the drive electrodes 5a and the sense electrodes 5b are electrically separated from each other.

It should be noted that, although the shapes of the unit electrodes are lozenge in the present embodiment, the shapes of the unit electrodes are not particularly limited.

Figure 5:
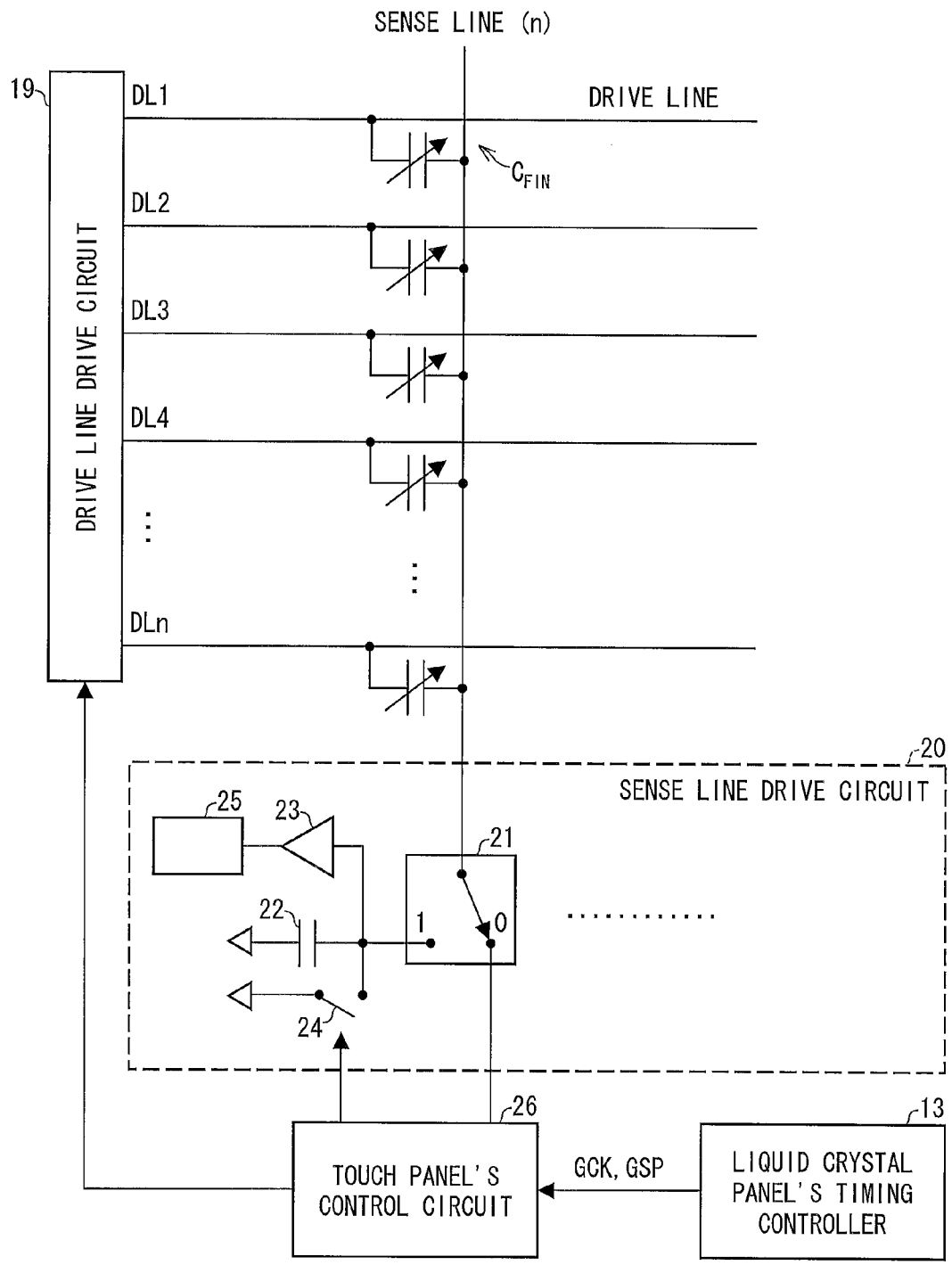
FIG. 5 schematically illustrates a configuration of the touch panel included in the liquid crystal display device of one embodiment of the present invention.

FIG. 5 schematically illustrates a configuration of the touch panel included in the liquid crystal display device 1.

The drive electrodes 5a illustrated in FIG. 4 correspond to drive lines DL1, DL2 . . . and DLn, respectively. The sense electrodes 5b correspond to respective sense lines (n).

At intersections of the drive lines DL1, DL2 . . . and DLn and the sense lines (n), variable capacitors are formed which change in capacitance when touched by a detection target such as a finger ($C_{FIN}$)

As illustrated in FIG. 5, a drive line drive circuit 19 sequentially applies a signal of a predetermined waveform to each of the drive lines DL1, DL2 . . . and DLn. That is, the drive line drive circuit 19 employs sequential driving by which to apply a signal of a predetermined waveform to the drive lines DL1, DL2 . . . and DLn in the order from the drive line DL1 to the drive line DLn.

Figure 6:
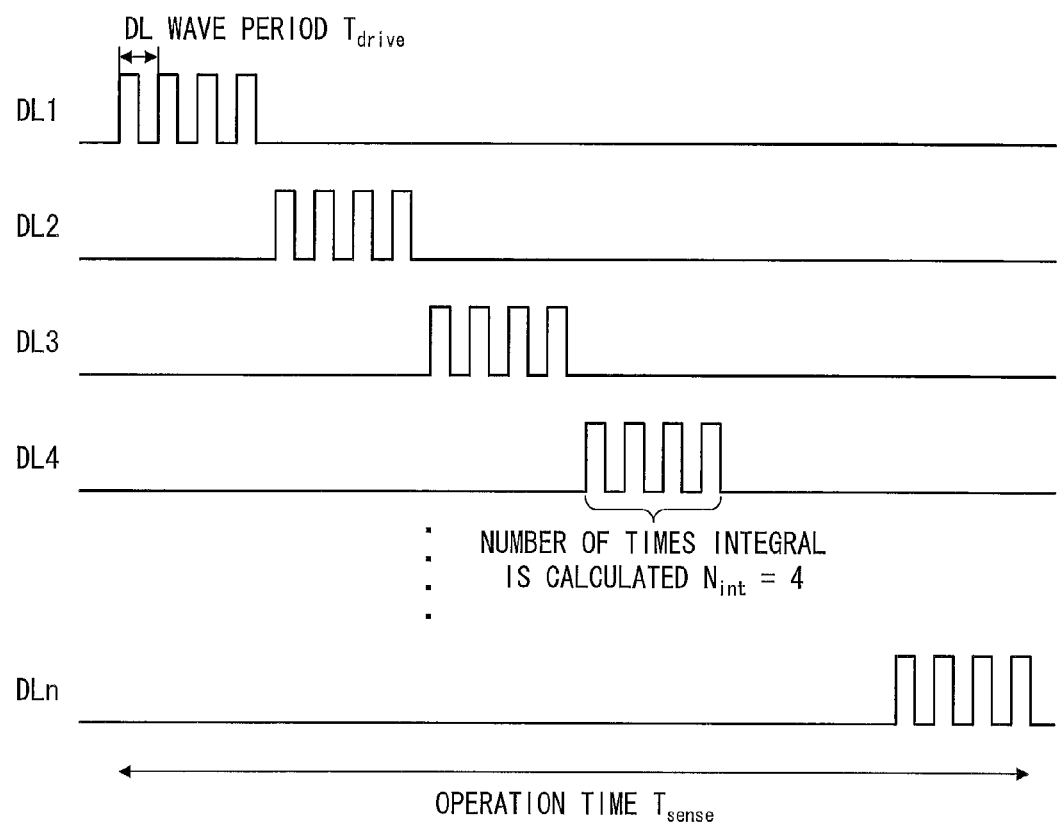
FIG. 6 illustrates signals applied to drive lines DL1, DL2, . . . and DLn of the touch panel included in the liquid crystal display device of one embodiment of the present invention.

FIG. 6 shows signals applied to the respective drive lines DL1, DL2 . . . and DLn.

Although not illustrated in FIG. 5, a sense line drive circuit 20 includes a sense line selection circuit that is capable of selecting a plurality of sense lines (n) at a time. The sense line selection circuit is configured such that a sampling circuit 21, a storage capacitor 22, an output amplifier 23, a reset switch 24, and measuring means 25 are provided for each of the sense lines (n).

The sense line selection circuit makes it possible to select a plurality of sense lines (n) at a time, and thus possible to reduce the time taken to carry out sensing.

Furthermore, a touch panel's control circuit 26 (i) receives a gate clock GCK and a gate start pulse GSP from the liquid crystal panel's timing controller 13, (ii) determines whether the liquid crystal panel is in a writing period or in an idle period, and (iii) if it has determined that the liquid crystal panel is in the idle period, sends a start signal to the drive line drive circuit 19 to cause the drive line drive circuit 19 to start applying a signal of a predetermined waveform to each of the drive lines DL1, DL2, . . . and DLn sequentially.

The touch panel's control circuit 26 supplies (i) a sampling signal to the sampling circuit 21 and (ii) a reset signal to the reset switch 24.

Figure 7:
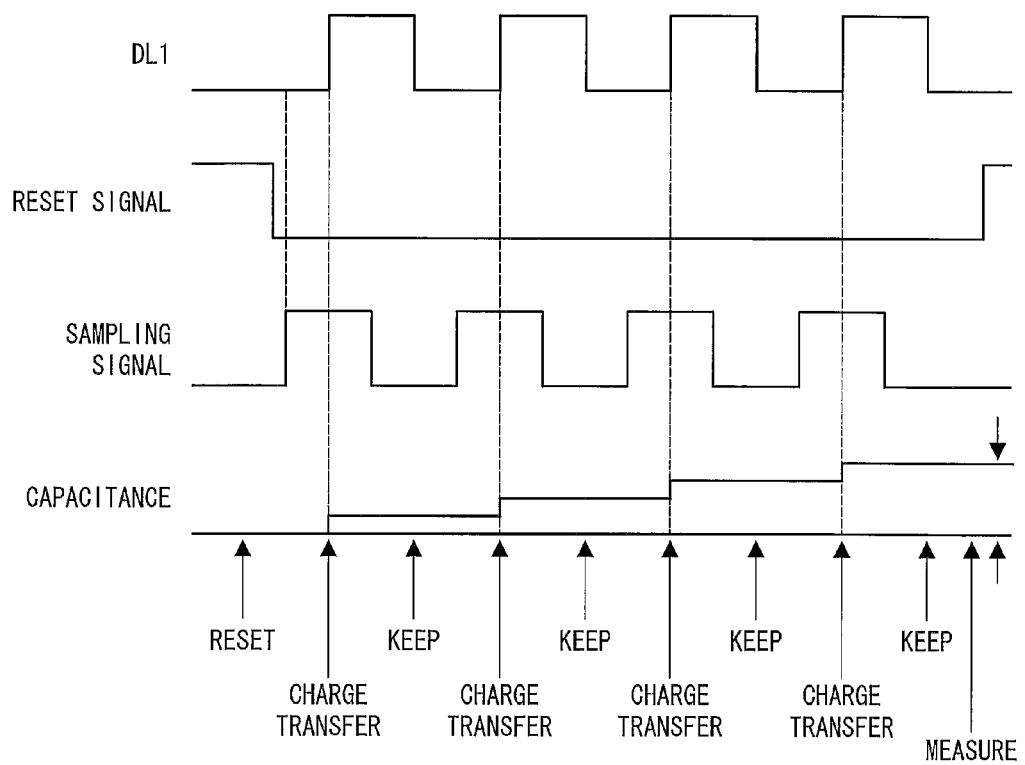
FIG. 7 is a timing chart showing timings of operation of the touch panel included in the liquid crystal display device of one embodiment of the present invention.

FIG. 7 is a timing chart showing timings of operation of the touch panel included in the liquid crystal display device 1.

As shown in FIG. 7, the reset signal is caused to be High at the time before both the signal applied to the drive line DL1 and the sampling signal become High, whereby the storage capacitor 22 is grounded and reset.

Next, the sampling signal is caused to be High at the time after the reset signal has become Low but before the signal applied to the drive line DL1 becomes High, whereby the sampling circuit 21 is changed from 0 state to 1 state. This allows output from a corresponding sense line (n) to be supplied to the storage capacitor 22 via the sampling circuit 21.

If the signal applied to the drive line DL1 becomes High while the sampling signal is High, electric charge is transferred to the storage capacitor 22. By changing the sampling signal to Low while the signal applied to the drive line DL1 is High, it is possible to keep (hold) the electric charge even after the signal applied to the drive line DL1 becomes Low.

According to the present embodiment, as shown in FIG. 6, the number of times $N_{int}$ an integral is calculated is four. That is, a set of charge transfer and keeping (holding) is carried out four times, and thereafter the measuring means 25 measures a capacitance via the output amplifier 23.

After the measurement, the reset signal is caused to return to High, whereby the storage capacitor 22 is grounded and reset.

FIG. 8 is a table for explaining the states of the sampling circuit 21 and the reset switch 24 in each step (STEP).

As shown in FIG. 8, STEP A is the step of all-reset. In this case, the sampling circuit 21 is in 0 state so that a corresponding sense line (n) is grounded, and the reset switch 24 causes the storage capacitor 22 to be grounded and reset.

STEP B is a dead time, which is from when the reset signal becomes Low to when the sampling signal becomes High.

In STEP C, the sampling circuit 21 changes to state, and the output from the sense line (n) is supplied to the storage capacitor 22 via the sampling circuit 21 (i.e., electric charge is transferred).

STEP D is a dead time, which is from when the sampling signal has become Low to when the signal applied to the drive line DL1 becomes Low.

In STEP E, the sampling circuit 21 changes to 0 state, and the sense line (n) and the storage capacitor 22 are electrically separated from each other (i.e., the electric charge is kept (held)).

A sequence of STEPS B to E is carried out four times. After that, in STEP F, the capacitance is measured by the measuring means 25 via the output amplifier 23 while the sampling circuit 21 remains in 0 state and the sense line (n) and the storage capacitor 22 are electrically separated from each other.

The following description discusses, with reference to FIGS. 9 and 10, what method can be employed in the liquid crystal panel's timing controller 13 (shown in FIG. 5) to drive the liquid crystal display device 1 in a case where the liquid crystal display device 1 includes the pixel TFT elements 11 which are single gate TFTs including an IGZO layer used in the present embodiment.

FIG. 9 shows (i) a writing period and (ii) an idle period during which the touch panel can be driven, which constitute one (1) frame period, in the case where the liquid crystal panel included in the liquid crystal display device 1 is driven at a low frequency of 30 Hz.

In the case of (a) of FIG. 9, the liquid crystal panel included in the liquid crystal display device 1 is driven at a low frequency of 30 Hz. Therefore, one (1) frame period is 33.3 ms which is twice as long as that in the case of operation at 60 Hz shown in FIG. 25.

Figure 25:
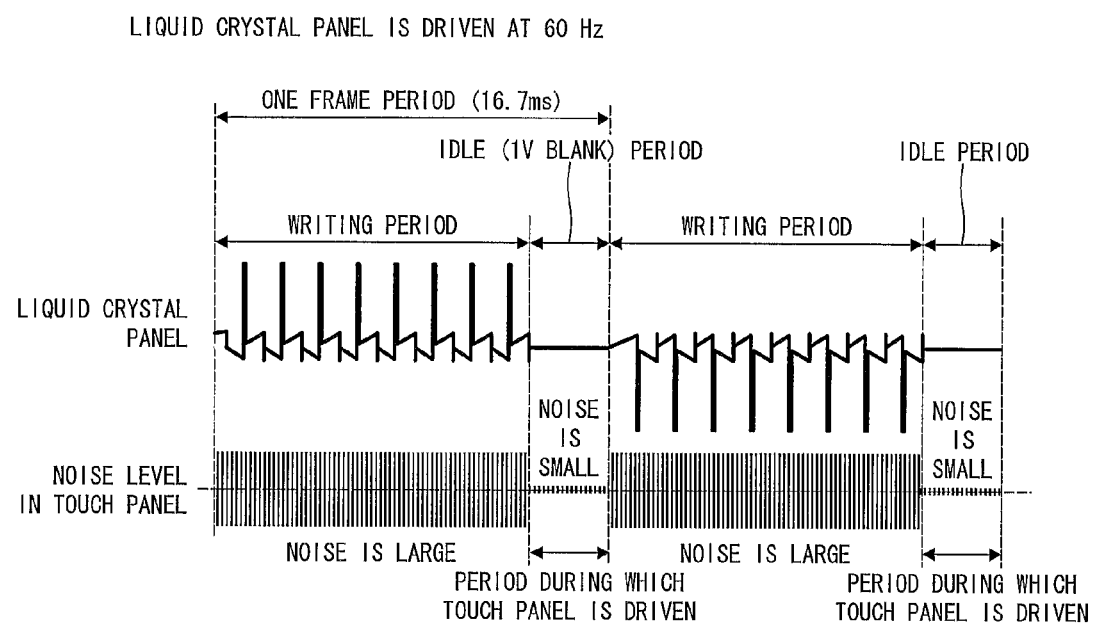
FIG. 25 shows a writing period and an idle period (1V blank) in one (1) frame period (16.7 ms) in a case where a conventional liquid crystal panel is driven at 60 Hz.

The length of the writing period is the same as that in the case of the driving at 60 Hz as shown in FIG. 25. However, by utilizing the characteristics of small current leakage, the liquid crystal panel is driven at a low frequency. This makes it possible to secure an idle period that is 16.7 ms longer than that in the case of operation at 60 Hz shown in FIG. 25.

Also in the case of (b) of FIG. 9, the liquid crystal panel included in the liquid crystal display device 1 is driven at a low frequency of 30 Hz. Therefore, one (1) frame period is 33.3 ms which is twice as long as that in the case of operation at 60 Hz shown in FIG. 25.

In addition, the liquid crystal panel in (b) of FIG. 9 includes high-performance pixel TFT elements 11 and thereby performs double-speed writing. This makes it possible to reduce the length of the writing period to ½ that in the case as shown in (a) of FIG. 9 or FIG. 25. That is, in the case as shown in (b) of FIG. 9, it is possible to secure a longer idle period than that in the case of (a) of FIG. 9.

FIG. 9 shows exemplary cases where one (1) frame period is 33.3 ms. However this does not imply any limitation. It is only necessary that the one (1) frame period is longer than 16.7 ms.

Since the length of one (1) frame period can be set so as to be longer than 16.7 ms, assuming that the length of the writing period remains the same, it is possible to increase the length of the idle period so that the number of times sensing is carried out in the position detecting section can be increased.

Furthermore, as for the relationship between the length of the writing period and the length of the idle period in the one (1) frame period, it is only necessary that the length of the writing period be as short as not more than twice that of the idle period so that the idle period in the one (1) frame period is long enough to increase the number of times sensing is carried out in the position detecting section.

FIG. 10 shows a case where the liquid crystal panel and the touch panel included in the liquid crystal display device 1 are driven at 60 Hz and 120 Hz, respectively.

In (a) of FIG. 10, the liquid crystal panel included in the liquid crystal display device 1 is driven at 60 Hz. Therefore, one (1) frame period is 16.7 ms. However, by employing double-speed writing, it is possible to reduce the writing period to ½ that in the case of FIG. 25. Therefore, it is possible to secure a relatively long idle period.

Furthermore, the touch panel is driven in two steps in the first and last portions of the idle period in one (1) frame period. This makes it possible to drive the liquid crystal panel at 60 Hz and the touch panel at 120 Hz.

In the case of (b) of FIG. 10, the liquid crystal panel included in the liquid crystal display device 1 is driven at 60 Hz. Therefore, one (1) frame period is 16.7 ms. However, by employing double-speed writing with the use of high-performance pixel TFT elements 11, the writing period is reduced to ½ that in the case of FIG. 25 and the writing is carried out in two steps within one (1) frame period.

In one (1) frame period, idle periods are provided after the respective two writing periods. That is, the touch panel is driven twice in one (1) frame period.

This makes it possible to drive the liquid crystal panel at 60 Hz and the touch panel at 120 Hz.

It should be noted that the cases shown in FIGS. 9 and 10 are examples, and therefore the present invention is not limited to these cases. For example, it is needless to say that the case where the touch panel is driven a plurality of times within one (1) frame period, as shown in FIG. 10, is applicable also to the case where the liquid crystal panel is driven at a low frequency.

In the case where the semiconductor layer in the pixel TFT elements is a poly Si layer or a CGS layer, it is difficult to drive the liquid crystal panel at a low frequency because the amount of current leakage is relatively large.

Embodiment 2

Figure 11:
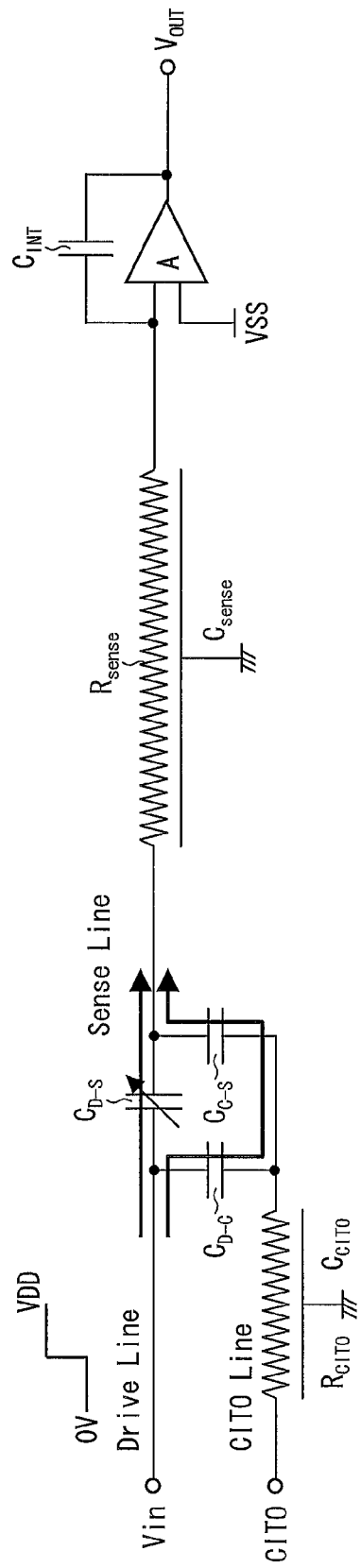
FIG. 11 illustrates an equivalent circuit of the touch panel in which a common electrode layer (CITO) having a relatively high resistance is provided near a drive line and a sense line.
Figure 12:
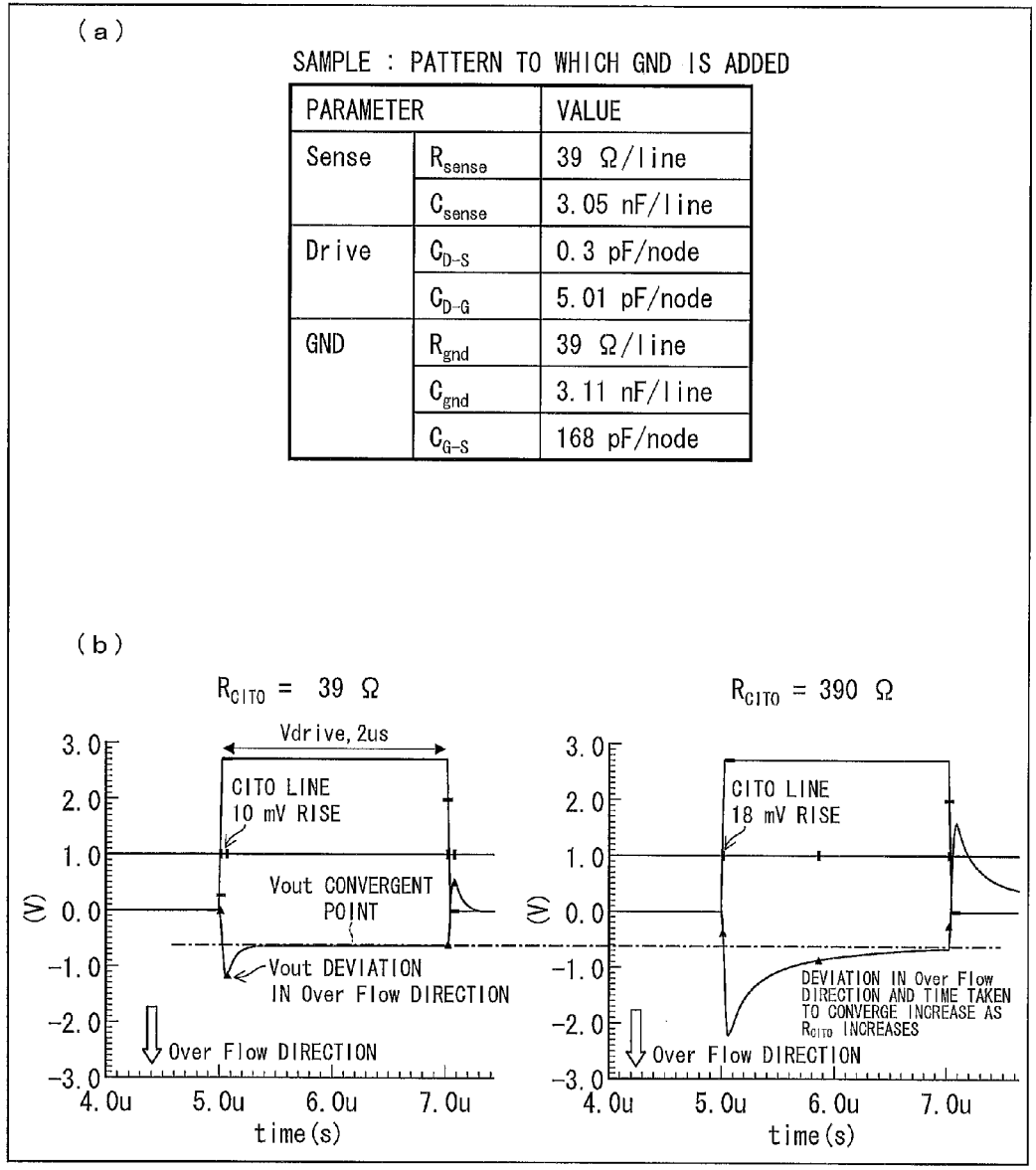
FIG. 12 shows (i) the values of parameters for simulation using a model obtained by adding a GND to the equivalent circuit illustrated in FIG. 11 and (ii) simulation waveforms.
Figure 13:
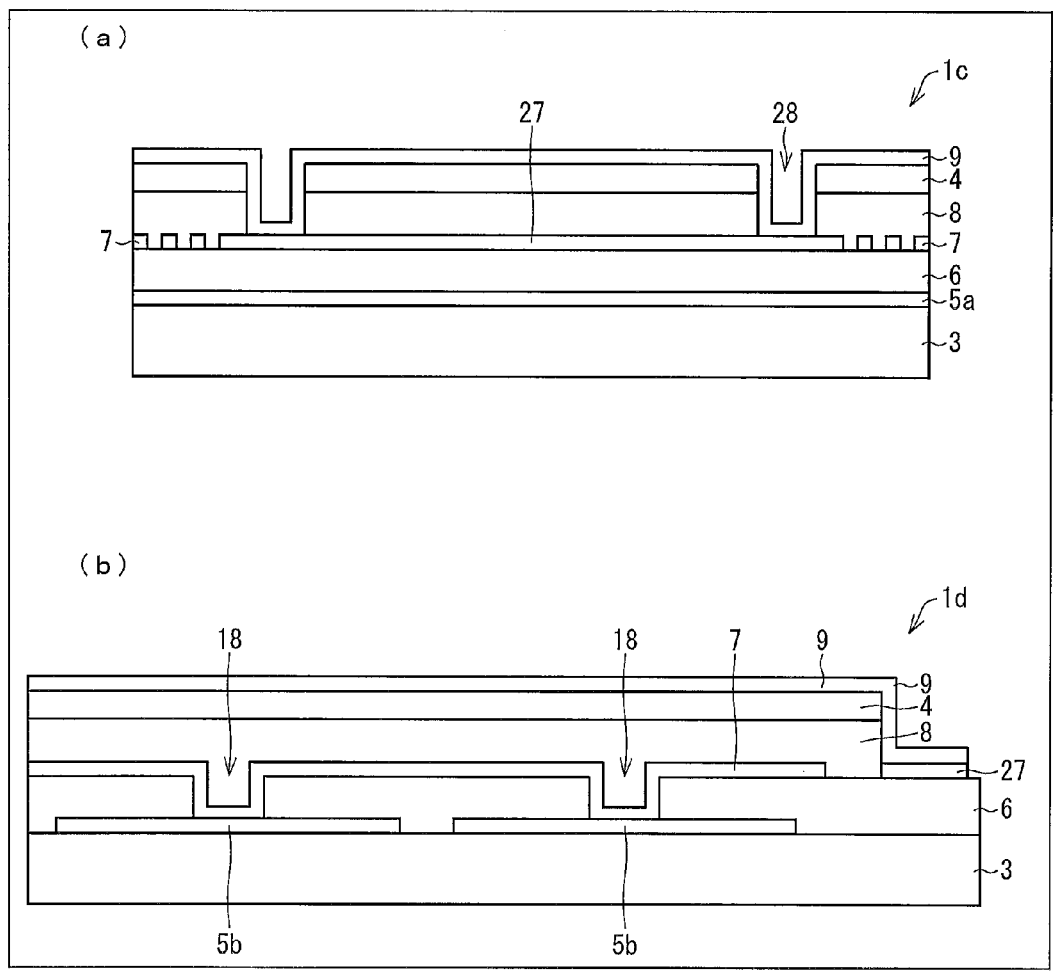
FIG. 13 illustrates examples of how a common electrode layer and a conductive layer are electrically connected to each other in a liquid crystal display device of the second embodiment of the present invention.

The following description discusses Embodiment 2 of the present invention with reference to FIGS. 11 to 13. A liquid crystal display device of the present embodiment includes, for a color filter substrates 1c or 1d, a liquid crystal panel's timing controller and a touch panel's control circuit usable for various driving methods as described in Embodiment 1. The liquid crystal display device of the present embodiment is different from Embodiment 1 in that, also for the liquid crystal panel including the touch panel, a metal conductive layer 27 is provided which is electrically connected to a common electrode layer 9 to reduce resistance of the common electrode layer 9. The other configurations of the liquid crystal display device of the present embodiment are as described in Embodiment 1. For convenience of description, members having functions identical to those illustrated in the drawings of Embodiment 1 are assigned identical referential numerals, and their descriptions are omitted here.

FIG. 11 illustrates an equivalent circuit of the touch panel in which a common electrode layer (CITO) having a relatively high resistance is provided near a drive line and a sense line.

In general, a variable capacitor $C_{D\text{-}S}$ should be formed only between a drive line and a sense line, and a signal of a predetermined waveform received at $V_{in}$ of the drive line should pass through the variable capacitor $C_{D\text{-}S}$ and the sense line and then be outputted via $V_{out}$. However, in a case where there is a common electrode layer (CITO) having a relatively high resistance near the drive line and the sense line, an unnecessary capacitor $C_{D\text{-}C}$ is formed between the common electrode layer (CITO) and the drive line and another unnecessary capacitor $C_{C\text{-}S}$ is formed between the common electrode layer (CITO) and the sense line. The signal of a predetermined waveform received at $V_{in}$ also passes through these capacitors.

(a) of FIG. 12 shows the values of parameters for simulation using a model obtained by adding a GND to the equivalent circuit illustrated in FIG. 11.

(b) of FIG. 12 shows a simulation waveform obtained in the case where the resistance of the common electrode layer (CITO) is 39Ω and a simulation waveform obtained in the case where the resistance of the common electrode layer (CITO) is 390Ω.

As shown in (b) of FIG. 12, in the case where the resistance of the common electrode layer (CITO) is 39Ω, $V_{out}$ deviates in the direction of Over Flow by a small amount and reaches a convergent point relatively quickly. On the other hand, in the case where the resistance of the common electrode layer (CITO) is 390Ω, $V_{out}$ deviates in the direction of Over Flow by a large amount and takes a considerable time to reach a convergent point.

Therefore, in the case where the resistance of the common electrode layer (CITO) is large, the time taken for the touch panel to carry out sensing is long. This is a problem.

In view of the circumstances, according to the present embodiment, for reducing the resistance of the common electrode layer 9, there is provided the metal conductive layer 27 which is electrically connected to the common electrode layer 9, whereby the time taken for the touch panel to carry out sensing is reduced.

FIG. 13 illustrates examples of how the common electrode layer 9 and the conductive layer 27 are electrically connected to each other.

The color filter substrate 1c illustrated in (a) of FIG. 13 has the following structure. The metal conductive layer 27, which is electrically separated from bridging electrodes 7, is provided and thereafter; a second insulating layer 8 and a black matrix/color filter layer 4 each having a contact hole 28 are provided and thereafter; the common electrode layer 9 is formed, whereby the common electrode layer 9 and the metal conductive layer 27 are electrically connected to each other and thus the resistance of the common electrode layer 9 is reduced.

On the other hand, the color filter substrate 1d illustrated in (b) of FIG. 13 is structured such that the common electrode layer 9 and the conductive layer 27 are electrically connected to each other at an end of the liquid crystal panel.

Usually, the common electrode layer 9 is made from ITO (indium tin oxide) or IZO (indium zinc oxide), which is a transparent conductive film, to ensure transparency. Therefore, the common electrode layer 9 usually has a relatively large resistance.

According to the above structures, the common electrode layer 9, which has a relatively large resistance, is electrically connected to the metal conductive layer 27. This makes it possible to reduce the resistance of the common electrode layer 9, and thus possible to prevent a large deviation of $V_{out}$. Accordingly, the time taken to carry out sensing is reduced. As such, it is possible to realize a liquid crystal display device that has an improved SN ratio and is capable of carrying out position detection with high accuracy.

The present invention is more suitably applicable to an in-cell touch panel as described in the present embodiment.

It should be noted that, in the present embodiment, the metal conductive layer 27 and the bridging electrodes 7 are made from an identical material.

In this case, the bridging electrodes 7 and the conductive layer 27 can be formed in a single step, because they are made from an identical material. This makes it possible to reduce the number of steps for producing the liquid crystal display device.

In the present embodiment, the metal conductive layer 27 is preferably made from a metal material, for example: a low-resistance metal such as titanium (Ti), copper (Cu), gold (Au), aluminum (Al), tungsten (W), zinc (Zn), nickel (Ni), tin (Sn), chromium (Cr), molybdenum (Mo) and/or tantalum (Ta); a compound of any of these metals; and/or a silicide of any of these metals.

Embodiment 3

The following description discusses Embodiment 3 of the present invention with reference to FIGS. 14 to 19. The present embodiment is different from Embodiments 1 and 2 in that the touch panel of the liquid crystal display device used in Embodiment 2 employs parallel driving. The other configurations are as described in Embodiments 1 and 2. For convenience of description, members having functions identical to those illustrated in the drawings of Embodiments 1 and 2 are assigned identical referential numerals, and their descriptions are omitted here.

FIG. 14 schematically illustrates a configuration of a touch panel included in a liquid crystal display device of the present embodiment.

As shown in FIG. 14, a drive line drive circuit 30 includes a drive line selection circuit 31 and an M-sequence generating circuit 32. A sense line drive circuit 33 includes a sense line selection circuit 34, an amplifier circuit 35, an A/D converter circuit 36, a correlation calculation circuit 37, and a touch position detection circuit 38.

Furthermore, a touch panel's control circuit 26 (i) receives a gate clock GCK and a gate start pulse GSP from a liquid crystal panel's timing controller 13, (ii) determines whether a liquid crystal panel is in a writing period or in an idle period, and (iii) if it has determined that the liquid crystal panel is in the idle period, sends predetermined signals to the drive line drive circuit 30 and the sense line drive circuit 33 to cause the drive line drive circuit 30 and the sense line drive circuit 33 to drive the touch panel by parallel driving.

Figure 15:
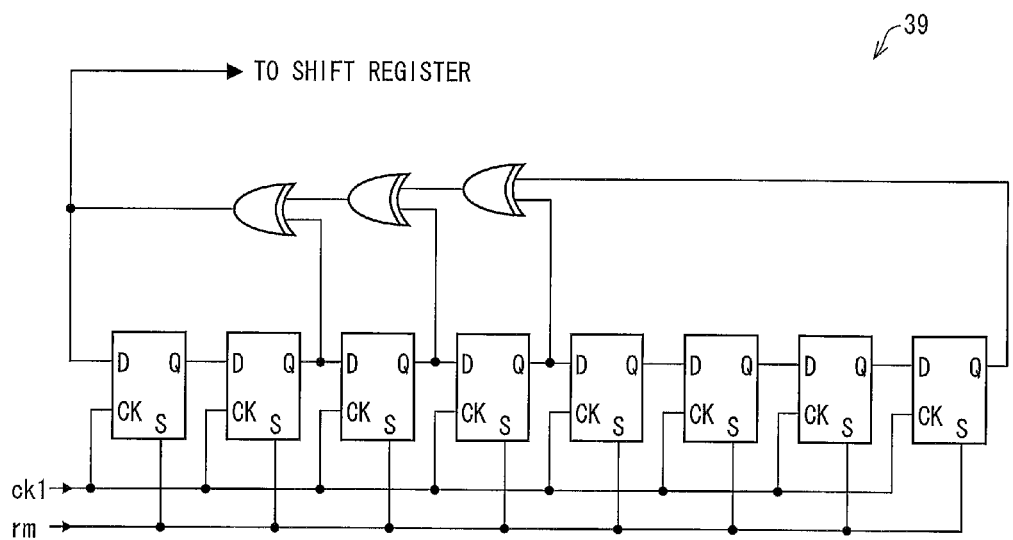
FIG. 15 illustrates an M-sequence generator included in an M-sequence generating circuit of the liquid crystal display device of the third embodiment of the present invention.

FIG. 15 illustrates an M-sequence generator 39 included in the M-sequence generating circuit 32.

The M-sequence generator 39 generates an M-sequence signal made up of 0 and/or 1 in accordance with a received clock.

As illustrated in FIG. 15, the M-sequence generator 39 includes eight flip-flops connected in a cascade arrangement. The M-sequence generator 39 is a circuit that generates 8th-order M-sequence, i.e., generates an M-sequence of 255 clocks (cycle=$2^8-1=255$).

In FIG. 15, output terminals Q of the second, third, fourth and eighth flip-flops from the left are connected to input terminals of three XOR (exclusive OR) circuits (see FIG. 15). In FIG. 15, an output terminal of the leftmost XOR circuit is connected to a data input terminal D of the first flip-flop from the left and also to an output terminal of the M-sequence generator 39 connected to a shift register. This generates an M-sequence signal M(i).

The Q output terminals of the eight flip-flops are all initially set to 1 by a reset pulse rm supplied from a touch panel's control circuit 29. Then, a clock ck1 is supplied continuously. Upon receipt of leading edges of the clock ck1, the M-sequence generator 39 outputs, via the output terminal, M-sequence signals M(0), M(1), . . . M(n−1), and M (K−1) on a time-series basis.

FIG. 16 schematically illustrates a configuration of the drive line drive circuit 30.

As illustrated in FIG. 16, in the M-sequence generating circuit 32, the M-sequence signals outputted from the output terminal of the M-sequence generator 39 are inputted to a shift register 40. Data is shifted every time the clock ck1 is inputted.

According to the present embodiment, the drive lines DL1, DL2 . . . are divided into groups each including four drive lines, and drive lines in the respective groups are driven at a time. Therefore, the shift register 40 includes a number of stages and output terminals that is one fourth the number of drive lines DL1, LD2 . . . .

The output terminals of the respective stages of the shift register 40 output code sequence signals (code sequence 1, code sequence 2, and so on).

The drive line selection circuit 31 includes switches 31a, 31b, 31c, 31d and so on. Each of the switches corresponds to four adjacent drive lines such as drive lines DL1 to DL4, drive lines DL5 to DL8, and drive lines DLn-3 to DLn.

The code sequences 1, 2 . . . outputted from the output terminals of the respective stages of the shift register 40 are supplied at a time to drive lines DL1, DL5, DL9, DL13 . . . which are selected by the switches 31a, 31b, 31c, 31d . . . , respectively.

After a certain period of time, specifically, after the code sequences 1, 2 . . . have been supplied to the drive lines DL1, DL5, DL9, DL13 . . . selected by the switches 31a, 31b, 31c, 31d . . . , respectively, the switches 31a, 31b, 31c, 31d . . . select the drive lines DL2, DL6, DL10, DL14 . . . , respectively, so that the code sequences 1, 2 . . . are supplied at a time to the drive lines DL2, DL6, DL10, DL14 and so on.

These processes are repeated, whereby all the drive lines DL1, DL2, DL3 . . . receive the code sequences 1, 2 and so on.

The above method makes it possible to supply the code sequences 1, 2 and so on at a time to drive lines which are as many as the switches 31a, 31b, 31c, 31d and so on. For example, in a case where there are twelve switches 31a, 31b, 31c, 31d . . . , it is possible to reduce the time taken to supply the code sequences 1, 2 . . . to all the drive lines DL1, DL2, DL3 . . . to one twelfth of the time taken in the case of a conventional method.

Pulse signals shown in FIG. 16 are examples of the code sequences 1, 2 and so on.

FIG. 17 schematically illustrates configurations of the sense line selection circuit 34 and the amplifier circuit 35 included in the sense line drive circuit 33.

As illustrated in FIG. 17, the sense line selection circuit 34 includes one (1) switch for every eight adjacent sense lines such as SeL1 to SeL8.

The switch selects a different one of the sense lines SeL1 to SeL8 in response to a signal from the touch panel's control circuit 29.

Such a sense line selection circuit 34 makes it possible to obtain detection signals from a plurality of sense lines at a time. For example, in a case where there are sixteen switches, it is possible to reduce the time taken to obtain the detection signals from all the sense lines SeL1 to SeLn to one sixteenth of the time taken in the case of a conventional scanning method.

The amplifier circuit 35 includes (i) I/V converter circuits 35a each constituted by an operational amplifier and a capacitor connected in parallel with the operation amplifier and (ii) a switch 35b.

Each of signals from sense lines selected by the switches is amplified by a corresponding operational amplifier to a predetermined signal level and then supplied to the A/D converter circuit 36 via the switch 35b.

FIG. 18 schematically illustrates a configuration of the correlation calculation circuit 37.

As illustrated in FIG. 18, the correlation calculation circuit 37 includes a signal delay circuit 37a, a register 37b, a correlator 37c, a calculation code sequence generating circuit 37d, and a correlation value storage circuit 37e.

The register 37b is provided between the correlator 37c and the output terminals of D-flip-flop circuits constituting the signal delay circuit 37a. The register 37b is configured to temporarily store detection signals B1 to Bn supplied from the respective D-flip-flop circuits.

The correlator 37c finds correlation values by correlation calculation between pieces of data C1 to Cn from the register 37b and pieces of data D1 to Dn from the calculation code sequence generating circuit 37d. When there is no detection target such as a finger on the touch panel, certain correlation values are obtained. However, when there is a detection target such as a finger on the touch panel, different correlation values from the certain correlation values are obtained. By utilizing this, it is possible to detect the touch position.

The output terminal of the correlator 37c is connected to the correlation value storage circuit 37e.

The calculation code sequence generating circuit 37d generates calculation code sequences on the basis of the code sequences 1, 2 . . . supplied from the M-sequence generating circuit 32, and supplies the calculation code sequences to the correlator 37c.

The correlation value storage circuit 37e is a memory section configured to temporarily store the correlation values supplied from the correlator 37c. The correlation value storage circuit 37e is connected to the touch position detection circuit 38.

Figure 19:
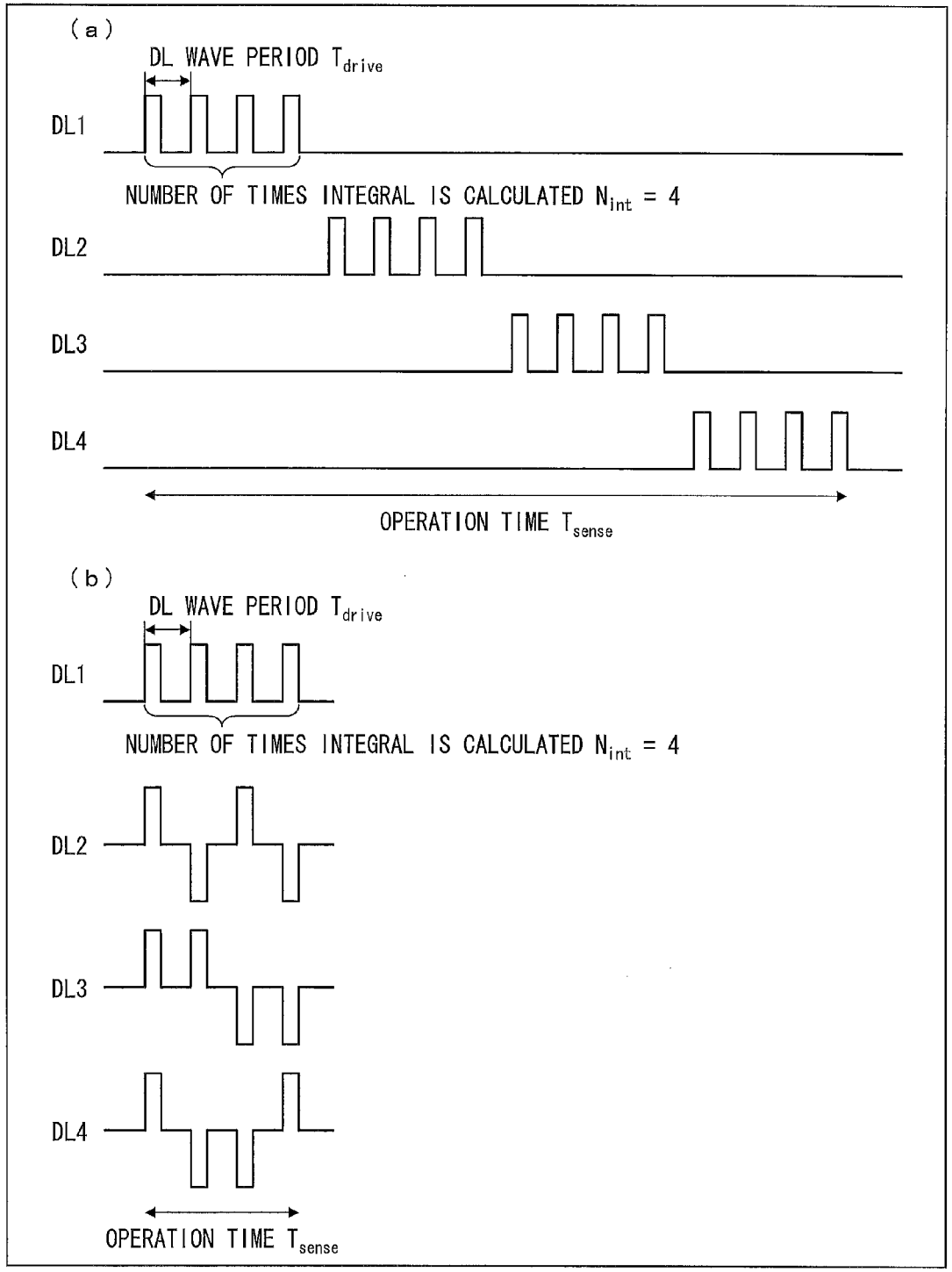
FIG. 19 is a drawing for explaining how parallel driving reduces the time taken for a touch panel to carry out sensing.
Figure 22:
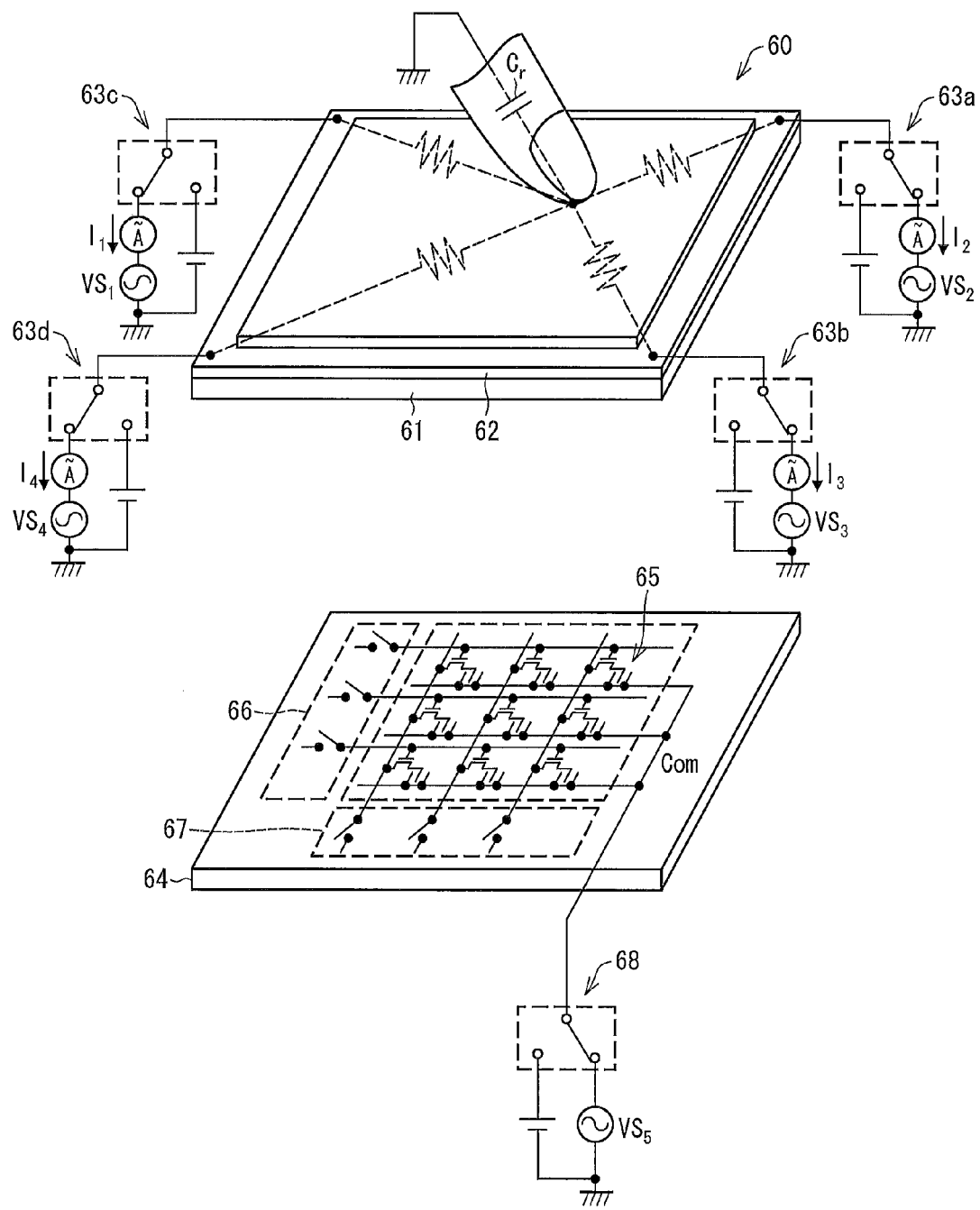
FIG. 22 schematically illustrates a configuration of a display device including a touch panel disclosed in Non-patent Literature 1.
Figure 23:
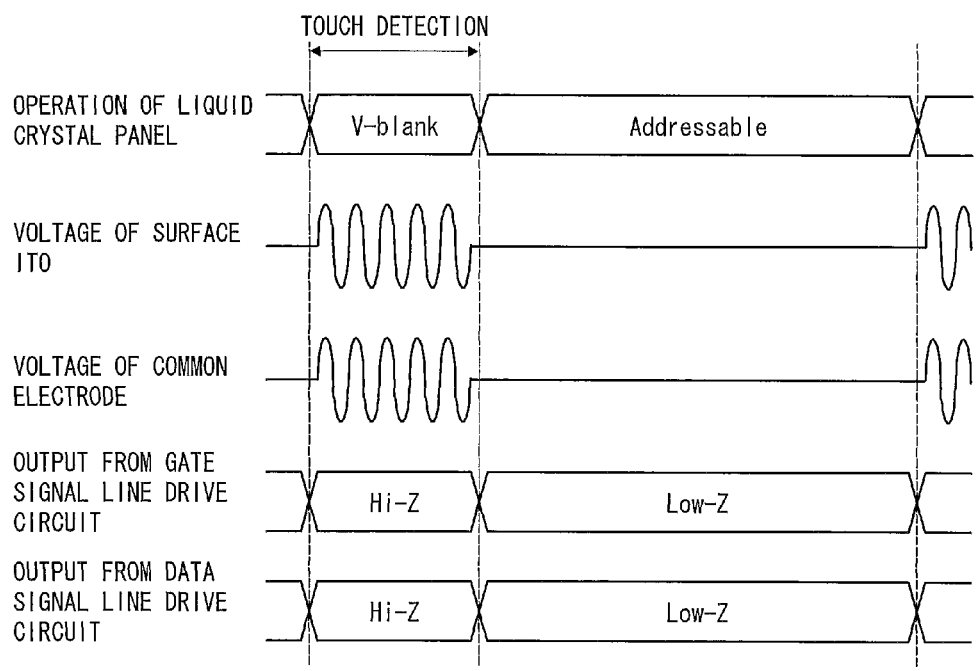
FIG. 23 illustrates timings of operation of the display device shown in FIG. 22.
Figure 24:
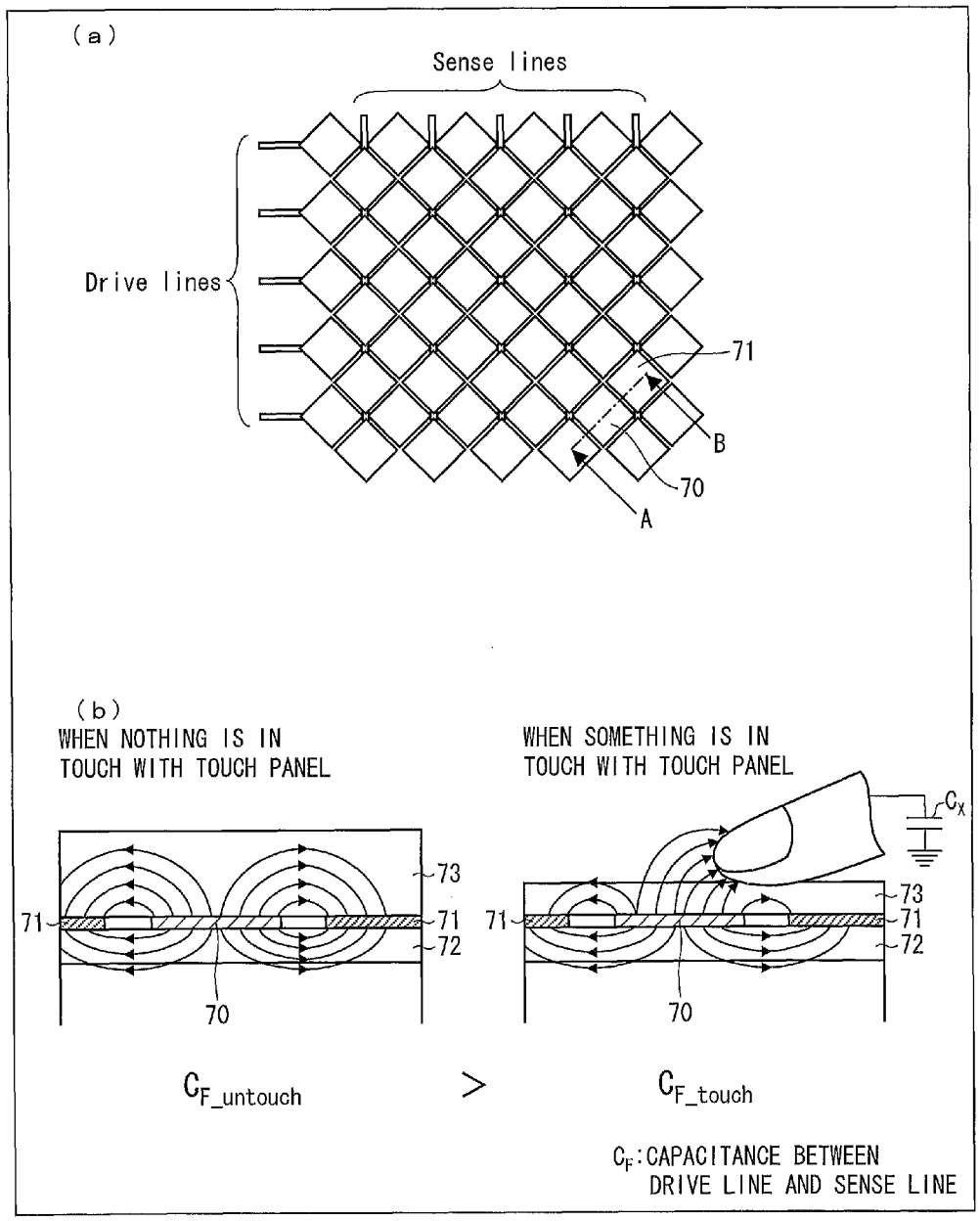
FIG. 24 (i) schematically illustrates a configuration of a mutual-capacitance touch panel which is a kind of capacitive touch panel and (ii) operating principle of the touch panel.

FIG. 19 is a drawing for explaining how parallel driving reduces the time taken for a touch panel to carry out sensing.

(a) of FIG. 19 shows sensing time $T_{sense}$ in the case of sequential driving, whereas (b) of FIG. 19 shows sensing time $T_{sense}$ in the case of parallel driving.

In a case where a DL wave period $T_{drive}$ is the same between (a) and (b) of FIG. 19 and the number of times $N_{int}$ an integral is calculated is the same between (a) and (b) of FIG. 19, the sensing time $T_{sense}$ in the case of parallel driving becomes shorter than the sensing time $T_{sense}$ in the case of sequential driving, because the parallel driving allows for driving of a plurality of drive lines at the same time.

It should be noted that, although the code sequences in the present embodiment are M-sequence signals, the code sequences are not limited to the M-sequence signals. For example, the code sequences may be Hadamard code sequences or the like.

Further note that, although the position of a detection target is detected on the basis of correlation values found by correlation calculation between code sequences in the present embodiment, this does not imply any limitation. It is also possible to detect the position of a detection target on the basis of values found by reconstructing code sequences by calculation.

The display device of the present invention is preferably configured such that the semiconductor layer is constituted by an oxide layer containing at least one element selected from the group consisting of In, Ga, and Zn; and the active element in each of the plurality of pixels in the display section is a single gate transistor.

According to the configuration, since the semiconductor layer for the active element included in each of the pixels in the display section is constituted by an oxide layer containing at least one element selected from the group consisting of In, Ga, and Zn, the amount of current leakage while the active element is in OFF state is small. Therefore, it is possible to use a single gate transistor as the active element.

The single gate transistor achieves higher drive performance than a dual gate transistor, because its channel length is half the channel length of the dual gate transistor and it does not suffer resistance attributed to LDD. Furthermore, the single gate transistor does not cause a reduction in the aperture ratio of each of the pixels in the display section.

Therefore, it is possible to realize a display device which includes (i) a position detecting section which has an improved SN ratio and is capable of carrying out position detection with high accuracy and (ii) a display section with a relatively high aperture ratio.

Alternatively, the semiconductor layer can be constituted by either a polycrystalline silicon layer or a continuous-grain silicon layer. It is preferable that the active element included in each of the plurality of pixels in the display section is a dual gate transistor.

According to the configuration, since the semiconductor layer for the active element included in each of the pixels in the display section is constituted by either the polycrystalline silicon layer (Poly-Si layer) or the continuous-grain silicon layer (Continuous Grain Si layer), the amount of current leakage (especially the amount of current leakage due to light) is relatively large. In order to reduce the amount of current leakage like this, the configuration uses the dual gate transistor.

Therefore, even in the case where the semiconductor layer in the active element in each of the pixels in the display section is constituted by a polycrystalline silicon layer or a continuous-grain silicon layer in which the amount of current leakage (especially the amount of current leakage due to light) is relatively large, it is possible to realize a display device which includes (i) a position detecting section which has an improved SN ratio and is capable of carrying out position detection with high accuracy and (ii) a display section.

The display device of the present invention is preferably configured such that the position detecting section has first electrodes arranged along a first direction and second electrodes arranged along a second direction which is different from the first direction, the first electrodes and the second electrodes intersecting each other; the first electrodes are electrically separated from each other and the second electrodes are electrically separated from each other; the first electrodes and the second electrodes have an insulating layer between them; the first electrodes and the second electrodes are coupled by capacitances in a plurality of portions in each of which one of the first electrodes and one of the second electrodes are close to each other; the first electrodes are supplied with predetermined signals which pass through the capacitances and are outputted via the second electrodes; and the capacitances change depending on whether there is the detection target in the portions in each of which one of the first electrodes and one of the second electrodes are close to each other, said display device further including: a detection circuit for the position detecting section, the detection circuit being configured to detect where, in the portions in each of which one of the first electrodes and one of the second electrodes are close to each other, the detection target is present, on the basis of the signals passing through the capacitances and outputted via the second electrodes.

According to the configuration, the display device includes a mutual-capacitance position detecting section which is a kind of capacitive position detecting section having a so-called multi-touch detecting function (that is, the capacitive position detecting section capable of, when a plurality of detection targets such as fingers make contact with the touch panel in different positions, detecting such a plurality of positions).

Therefore, it is possible to realize a display device which includes (i) a position detecting section which has the multi-touch detecting function, has an improved SN ratio and is capable of carrying out position detection with high accuracy and (ii) a display section.

It is preferable that the display device of the present invention is configured such that: the first electrodes and the second electrodes are each constituted by unit electrodes which have a predetermined shape and are electrically connected with each other; the first electrodes or the second electrodes are configured such that adjacent ones of the unit electrodes are electrically connected with each other via a first conductive layer that is different from the first electrodes and the second electrodes; and the unit electrodes of the first electrodes and the unit electrodes of the second electrodes are provided on an identical plane in such a manner that they are adjacent to each other without overlapping each other when viewed from above.

According to the configuration, the unit electrodes of the first electrodes and the unit electrodes of the second electrodes are provided on an identical plane. This makes it possible to realize a display device which includes a thinner position detecting section and a display device.

Furthermore, according to the configuration, since the unit electrodes of the first electrodes and the unit electrodes of the second electrodes are provided on an identical plane, for example in the case of a configuration including a common electrode layer like a liquid crystal display device, it is possible to keep a distance between (i) the unit electrodes of the first electrodes and the unit electrodes of the second electrodes and (ii) the common electrode layer. This makes it possible to reduce parasitic capacitance between (i) the unit electrodes of the first electrodes and the unit electrodes of the second electrodes and (ii) the common electrode layer, as compared to the case where the unit electrodes of the first electrodes and the unit electrodes of the second electrodes are provided on different layers.

Therefore, according to the configuration, it is possible to realize a display device which includes (i) a position detecting section which has an excellent position detecting function and is capable of stable position detecting operation and (ii) a display section.

It is preferable that the display device of the present invention is configured such that the control circuit for the position detecting section is configured to cause the position detecting section to carry out sensing a plurality of times at a predetermined frequency during the second period.

It is preferable that the display device of the present invention is configured such that each of the first and second periods in the one frame period for the display section is divided into a plurality of periods; the timing control section for the display section is configured to cause the display section to carry out writing of image data sequentially in steps at a predetermined frequency during the one frame period; and the control circuit for the position detecting section is configured to cause the position detecting section to carry out sensing a plurality of times at a predetermined frequency during the one frame period.

According to the configurations, it is possible to realize a display device which includes (i) a position detecting section which is driven at a higher frequency than a display section and is capable of carrying out position detection with higher accuracy and (ii) the display section.

The display device of the present invention is preferably configured such that the display section includes an upper substrate and a lower substrate, and the position detecting section is provided between the upper substrate and the lower substrate.

According to the configuration, it is possible to realize a display device which includes an in-cell position detecting section.

The present invention is more suitably applicable to a display device including an in-cell position detecting section, because the distance between the position detecting section and a display section is smaller and thus there is a significant effect of radiation noise from the display section.

The display device of the present invention is preferably configured such that the display section is a liquid crystal panel including a liquid crystal layer.

According to the configuration, it is possible to realize a display device including (i) a position detecting section which has an improved SN ratio and is capable of carrying out position detection with high accuracy and (ii) a liquid crystal panel.

It is preferable that the display device of the present invention is configured such that the display section includes an upper substrate, a lower substrate and a liquid crystal layer sandwiched between the upper substrate and the lower substrate; the upper substrate or the lower substrate includes a common electrode layer; a second conductive layer made from metal is (i) provided on a plane where the first conductive layer is provided and (ii) electrically separated from the first conductive layer; and the second conductive layer is electrically connected to the common electrode layer.

Usually, the common electrode layer is made from ITO (indium tin oxide) or IZO (indium zinc oxide), which is a transparent conductive film, to ensure transparency. Therefore, the common electrode layer usually has a relatively large resistance.

In a case where there is a common electrode layer having a relatively high resistance near the first electrodes and the second electrodes, a contact position detection signal largely deviates and takes time to become stable. Therefore, the time taken for sensing becomes long.

According to the configuration, the common electrode layer, which has a relatively large resistance, is electrically connected to the second conductive layer made from metal. This makes it possible to reduce the resistance of the common electrode layer, and thus possible to prevent a large deviation of the contact position detection signal. Accordingly, the time taken to carry out sensing is reduced. As such, it is possible to realize a liquid crystal display device including (i) a position detecting section that has an improved SN ratio and is capable of carrying out position detection with high accuracy and (ii) a liquid crystal panel.

It is preferable that the display device of the present invention is configured such that the position detecting section is provided between the upper substrate and the lower substrate.

In a display device including an in-cell position detecting section, the distance between the position detecting section and the common electrode layer is small. Therefore, a contact position detection signal deviates more largely and takes time to become stable, and therefore the time taken for sensing becomes long.

Accordingly, the present invention is more suitably applicable to a display device including an in-cell position detecting section.

The display device of the present invention is preferably configured such that the first conductive layer and the second conductive layer are made from an identical material.

According to the configuration, since the first conductive layer and the second conductive layer are made from an identical material, the first conductive layer and the second conductive layer can be produced in a single step.

This makes it possible to reduce the number of steps for producing the display device.

It is preferable that the display device of the present invention further includes: a code sequence signal supplying circuit for applying, to two or more of the first electrodes, signals having respective different code sequences at a time, and that the detection circuit for the position detecting section is being configured to detect the position of the detection target on the basis of values found by reconstructing, by calculation, the signals supplied from the capacitances via the second electrodes and the code sequences.

According to the configuration, the position detecting section is capable of detecting a plurality of positions on one of the second electrodes at the same time. Therefore, assuming that the number of times sensing is carried out is the same, it is possible to reduce the time required for sensing.

Since the time required for sensing is reduced, it is possible to increase the number of times the sensing is carried out. Therefore, it is possible to realize a display device that includes (i) a position detecting section that has an improved SN ratio and is capable of carrying out position detection with high accuracy and (ii) a display section.

The display device of the present invention is preferably configured such that each of the code sequences is an M-sequence signal generated by an M-sequence generating circuit, and the detection circuit for the position detecting section is configured to detect the position of the detection target on the basis of correlation values found by correlation calculation between the signals obtained from the capacitances via the second electrodes and the code sequences.

According to the configuration, it is possible to relatively easily generate the code sequences.

This makes it possible to produce a display device without increasing the size or cost.

It is preferable that the display device of the present invention is configured such that the display section is an organic EL display including an organic light-emitting layer.

According to the configuration, it is possible to realize an organic EL display device including (i) a position detecting section which has an improved SN ratio and is capable of carrying out position detection with high accuracy and (ii) an organic EL panel.

The present invention is not limited to the descriptions of the respective embodiments, but may be altered in various ways within the scope of the claims. An embodiment derived from a proper combination of technical means disclosed in different embodiments is encompassed in the technical scope of the invention.

INDUSTRIAL APPLICABILITY

The present invention is suitably applicable to display devices.

REFERENCE SIGNS LIST

1 Liquid Crystal display device (display device)
1a TFT substrate
1b, 1c, 1d color filter substrate
2 insulating substrate (lower substrate)
3 insulating substrate (upper substrate)
4 black matrix/color filter layer
5a drive electrode (first electrode)
5b sensing electrode (second electrode)
6 first insulating layer
7 bridging electrode
8 second insulating layer
9 common electrode layer
10 liquid crystal layer
11 pixel TFT element
12 pixel electrode
13 liquid crystal panel's timing controller (timing control section)
14 scanning signal line drive circuit
15 data signal line drive circuit
16 SEM semiconductor layer
19, 30 drive line drive circuit
20, 33 sense line drive circuit
26, 29 touch panel's control circuit (control circuit for position detecting section)
27 metal conductive layer
32 M-sequence generating circuit (code sequence signal supplying circuit)
37 correlation calculation circuit
38 touch position detection circuit
GLn scanning signal line
SLn data signal line
DLn drive line (first electrode)
SeLn sense line (second electrode)

The invention claimed is:

1. A display device, comprising:
a position detecting section; and
a display section including a plurality of pixels, wherein
each of the plurality of pixels including an active element including a semiconductor layer constituted by an oxide layer containing at least one element selected from the group consisting of In, Ga, and Zn, and
the display section being configured to operate such that one frame period is constituted by (i) a first period during which image data is sequentially written to the plurality of pixels and (ii) a second period other than the first period,
said display device further comprising:
a timing control section for the display section, the timing control section being configured to carry out control so that (i) a length of the first period is not more than twice that of the second period and/or (ii) the one frame period is longer than 16.7 msec;
a control circuit for the position detecting section, the control circuit being configured to carry out sensing during the second period to thereby detect a position of a detection target;
the position detecting section has first electrodes arranged along a first direction and second electrodes arranged along a second direction which is different from the first direction, the first electrodes and the second electrodes intersecting each other;
the first electrodes are electrically separated from each other and the second electrodes are electrically separated from each other;
the first electrodes and the second electrodes have an insulating layer between them;
the first electrodes and the second electrodes are coupled by capacitances in a plurality of portions in each of which one of the first electrodes and one of the second electrodes are close to each other;
the first electrodes are supplied with predetermined signals which pass through the capacitances and are outputted via the second electrodes; and
the capacitances change depending on whether there is the detection target in the portions in each of which one of the first electrodes and one of the second electrodes are close to each other,
said display device further comprising:
a detection circuit for the position detecting section, the detection circuit being configured to detect where, in the portions in each of which one of the first electrodes and one of the second electrodes are close to each other, the detection target is present, on the basis of the signals passing through the capacitances and outputted via the second electrodes;
the first electrodes and the second electrodes are each constituted by unit electrodes which have a predetermined shape and are electrically connected with each other;
the first electrodes or the second electrodes are configured such that adjacent ones of the unit electrodes are electrically connected with each other via a first conductive layer that is different from the first electrodes and the second electrodes;
the unit electrodes of the first electrodes and the unit electrodes of the second electrodes are provided on an identical plane in such a manner that they are adjacent to each other without overlapping each other when viewed from above;

the display section includes an upper substrate, a lower substrate and a liquid crystal layer sandwiched between the upper substrate and the lower substrate;

the upper substrate or the lower substrate includes a common electrode layer;

a second conductive layer made from metal is (i) provided on a plane where the first conductive layer is provided and (ii) electrically separated from the first conductive layer; and the second conductive layer is electrically connected to the common electrode layer.

2. The display device according to claim 1, wherein:

the semiconductor layer is constituted by an oxide layer containing at least one element selected from the group consisting of In, Ga, and Zn; and the active element in each of the plurality of pixels in the display section is a single gate transistor.

3. The display device according to claim 1, wherein the control circuit for the position detecting section is configured to cause the position detecting section to carry out sensing a plurality of times at a predetermined frequency during the second period.

4. The display device according to claim 1, wherein:

each of the first and second periods in the one frame period for the display section is divided into a plurality of periods;

the timing control section for the display section is configured to cause the display section to carry out writing of image data sequentially in steps at a predetermined frequency during the one frame period; and the control circuit for the position detecting section is configured to cause the position detecting section to carry out sensing a plurality of times at a predetermined frequency during the one frame period.

5. The display device according to claim 1, wherein:

the display section includes an upper substrate and a lower substrate, and the position detecting section is provided between the upper substrate and the lower substrate.

6. The display device according to claim 5, wherein the display section is a liquid crystal panel including a liquid crystal layer.

7. The display device according to claim 1, wherein the position detecting section is provided between the upper substrate and the lower substrate.

8. The display device according to claim 1, wherein the first conductive layer and the second conductive layer are made from an identical material.

9. A display device according to claim 1, further comprising:

a code sequence signal supplying circuit for applying, to two or more of the first electrodes, signals having respective different code sequences at a time, the detection circuit for the position detecting section being configured to detect the position of the detection target on the basis of values found by reconstructing, by calculation, the signals supplied from the capacitances via the second electrodes and the code sequences.

10. The display device according to claim 9, wherein:

each of the code sequences is an M-sequence signal generated by an M-sequence generating circuit, and the detection circuit for the position detecting section is configured to detect the position of the detection target on the basis of correlation values found by correlation calculation between the signals obtained from the capacitances via the second electrodes and the code sequences.

11. The display device according to claim 1, wherein the display section is an organic EL display including an organic light-emitting layer.

* * * * *